(12) United States Patent
Wang et al.

(10) Patent No.: US 7,262,764 B2
(45) Date of Patent: Aug. 28, 2007

(54) UNIVERSAL COMPUTING DEVICE FOR SURFACE APPLICATIONS

(75) Inventors: Jian Wang, Haidian District (CN); Chunhui Zhang, Haidian District (CN)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 10/751,877

(22) Filed: Jan. 7, 2004

(65) Prior Publication Data

US 2004/0140964 A1    Jul. 22, 2004

Related U.S. Application Data

(63) Continuation-in-part of application No. 10/284,417, filed on Oct. 31, 2002, now Pat. No. 7,009,594.

(51) Int. Cl.
*G09G 5/00* (2006.01)
(52) U.S. Cl. ............ 345/179; 345/156; 345/173; 345/175; 345/178
(58) Field of Classification Search ........ 345/173–180, 345/156; 715/863; 235/462.45, 462.46, 235/472, 469, 472.01; 382/101, 187, 182, 382/185; 361/692; 358/474; 713/176; 704/242; 359/642
See application file for complete search history.

(56) References Cited

U.S. PATENT DOCUMENTS

| | | | | |
|---|---|---|---|---|
| 5,521,986 A | * | 5/1996 | Curtin et al. | 382/187 |
| 5,564,005 A | * | 10/1996 | Weber et al. | 715/863 |
| 5,592,607 A | * | 1/1997 | Weber et al. | 715/863 |
| 5,661,291 A | * | 8/1997 | Ahearn et al. | 235/462.46 |
| 5,749,070 A | * | 5/1998 | Gourdol | 704/242 |
| 5,774,602 A | | 6/1998 | Taguchi et al. | |
| 5,818,436 A | * | 10/1998 | Imai et al. | 715/500.1 |
| 6,054,990 A | * | 4/2000 | Tran | 715/863 |
| 6,081,261 A | | 6/2000 | Wolff et al. | |

(Continued)

FOREIGN PATENT DOCUMENTS

EP    1276073 A2    6/2002

(Continued)

OTHER PUBLICATIONS

Internet printout—http:/www.anotofunctionality.com: Anoto Functionality—How does it work?, Sep. 26, 2002.

(Continued)

*Primary Examiner*—Bipin Shalwala
*Assistant Examiner*—Prabodh Dharia
(74) *Attorney, Agent, or Firm*—Banner & Witcoff, Ltd.

(57) ABSTRACT

A universal input device for use with a surface, such as a whiteboard, is provided. The universal input device can be used to control various computing devices as well as capture handwritten electronic ink and have the electronic ink be associated with new or stored documents. The universal input device can be coupled to a whiteboard marker for use with a conventional whiteboard. The universal input device can track the movement of the whiteboard marker on the whiteboard for transmission to a host PC applying those movements to a document and/or other application. The universal input device can identify the width of the marker's tip as well as the marker color. A digital eraser tracks the movement of a conventional whiteboard eraser across the surface of the whiteboard. An encoded medium can be placed over a conventional whiteboard for tracking of the movements.

21 Claims, 14 Drawing Sheets

U.S. PATENT DOCUMENTS

| | | | |
|---|---|---|---|
| 6,111,506 A | 8/2000 | Yap et al. | |
| 6,181,329 B1 | 1/2001 | Stork et al. | |
| 6,396,598 B1* | 5/2002 | Kashiwagi et al. | 358/474 |
| 6,408,330 B1 | 6/2002 | DeLaHuerga | |
| 6,417,844 B1* | 7/2002 | Kodama | 345/173 |
| 6,466,197 B1* | 10/2002 | Kim et al. | 345/156 |
| 6,532,152 B1* | 3/2003 | White et al. | 361/692 |
| 6,546,134 B1* | 4/2003 | Shrairman et al. | 382/186 |
| 6,585,154 B1 | 7/2003 | Ostrover et al. | |
| 6,603,464 B1 | 8/2003 | Rabin | |
| 6,647,145 B1* | 11/2003 | Gay | 382/187 |
| 6,681,044 B1* | 1/2004 | Ma et al. | 382/185 |
| 6,681,045 B1 | 1/2004 | Lapstun et al. | |
| 6,752,317 B2* | 6/2004 | Dymetman et al. | 235/462.45 |
| 6,760,009 B2* | 7/2004 | Omura et al. | 345/157 |
| 6,832,724 B2* | 12/2004 | Yavid et al. | 235/454 |
| 6,832,729 B1* | 12/2004 | Perry et al. | 235/472.01 |
| 6,865,325 B2* | 3/2005 | Ide et al. | 385/120 |
| 6,935,566 B1* | 8/2005 | Mulla et al. | 235/472.01 |
| 6,938,222 B2* | 8/2005 | Hullender et al. | 715/863 |
| 6,956,968 B1* | 10/2005 | O'Dell et al. | 382/182 |
| 6,999,622 B2* | 2/2006 | Komatsu | 382/202 |
| 7,009,594 B2* | 3/2006 | Wang et al. | 345/156 |
| 2001/0020935 A1* | 9/2001 | Gelbman | 345/173 |
| 2002/0024499 A1* | 2/2002 | Karidis et al. | 345/156 |
| 2002/0163510 A1 | 11/2002 | Williams et al. | |
| 2003/0088781 A1 | 5/2003 | ShamRao | |
| 2003/0090475 A1 | 5/2003 | Paul et al. | |
| 2003/0159044 A1 | 8/2003 | Doyle et al. | |
| 2003/0179906 A1* | 9/2003 | Baker et al. | 382/101 |
| 2003/0214553 A1* | 11/2003 | Dodge | 347/41 |
| 2003/0231785 A1* | 12/2003 | Rhoads et al. | 382/100 |
| 2004/0027338 A1* | 2/2004 | Lampson | 345/173 |
| 2004/0036681 A1* | 2/2004 | Kluttz et al. | 345/173 |
| 2004/0074971 A1* | 4/2004 | Swartz et al. | 235/472.01 |
| 2004/0085286 A1* | 5/2004 | Wang et al. | 345/156 |
| 2004/0136083 A1* | 7/2004 | Wang et al. | 359/642 |
| 2004/0140965 A1* | 7/2004 | Wang et al. | 345/179 |
| 2004/0153649 A1 | 8/2004 | Rhoads et al. | |
| 2004/0155110 A1* | 8/2004 | Ehrhart et al. | 235/469 |
| 2004/0233163 A1 | 11/2004 | Lapstun et al. | |
| 2005/0073508 A1* | 4/2005 | Pittel et al. | 345/175 |
| 2005/0104909 A1 | 5/2005 | Okamura et al. | |
| 2006/0033713 A1* | 2/2006 | Pryor | 345/158 |
| 2006/0176287 A1* | 8/2006 | Pittel et al. | 345/179 |

FOREIGN PATENT DOCUMENTS

| | | |
|---|---|---|
| JP | 06230886 A | 8/1994 |

OTHER PUBLICATIONS

Internet printout—http:/www.anotofunctionality.com: Anoto Functionality—Anoto pattern & digital paper, Sep. 26, 2002.

Internet printout—http:/www.anotofunctionality.com: Anoto Functionality—Digital pens, Sep. 26, 2002.

Internet printout—http:/www.anotofunctionality.com: Anoto Functionality—Digital pens Use with personal computers, Sep. 26, 2002.

Internet printout—http:/www.anotofunctionality.com: Anoto Functionality—What is Anoto functionality?, Sep. 5, 2003.

Internet printout—http:/www.anotofunctionality.com: Anoto Functionality—Anoto pattern & digital paper, Sep. 5, 2003.

Internet printout—http:/www.anotofunctionality.com: Anoto Functionality—Digital pens Use with mobile phones, Sep. 5, 2003.

Internet printout—http:/www.anotofunctionality.com: Anoto Functionality—Security, Sep. 5, 2003.

Internet printout—http:/www.anotofunctionality.com: Anoto Functionality—Applications, Sep. 5, 2003.

Internet printout—http:/www.anotofunctionality.com: Anoto Functionality—E-mail, Sep. 5, 2003.

Internet printout—http:/www.anotofunctionality.com: Anoto Functionality—Fax, Sep. 5, 2003.

Internet printout—http:/www.functionality.com: Anoto Functionality—Graphical SMS, Sep. 5, 2003.

Internet printout—http:/www.functionality.com: Anoto Functionality—Digital notes, Sep. 5, 2003.

Internet printout—http:/www.functionality.com: Anoto Functionality—Corporate applications, Sep. 5, 2003.

Internet printout—http:/www.functionality.com: Anoto Functionality—Freedom of expression, Sep. 26, 2002.

Internet printout—http:/www.functionality.com: Anoto Functionality—You to yourself, Sep. 26, 2002.

Internet printout—http:/www.functionality.com: Anoto Functionality—You to someone else, Sep. 26, 2002.

Internet printout—http:/www.functionality.com: Anoto Functionality—You to an organization, Sep. 26, 2002.

Internet printout—http:/www.functionality.com: Anoto Functionality—Hints & tips, Sep. 5, 2003.

Internet printout—http:/www.functionality.com: Anoto Functionality—Hints & tips Using your digital pen, Sep. 5, 2003.

Internet printout—http:/www.functionality.com: Anoto Functionality—Hints & tips Using your digital paper, Sep. 5, 2003.

Internet printout—http:/www.functionality.com: Anoto Functionality—Digital paper, Sep. 26, 2002.

Internet printout—http:/www.functionality.com: Anoto Functionality—Digital service, Sep. 26, 2002.

Internet printout—http:/www.functionality.com: Anoto Functionality—Hints & tips Using your digital service, Sep. 5, 2003.

Internet printout—http:/www.anotofunctionality.com: Anoto Functionality—Digital pens, Sep. 5, 2003.

Internet printout—http:/www.anotofunctionality.com: Anoto Functionality—Digital paper, Sep. 5, 2003.

Internet printout—http:/www.anotofunctionality.com: Anoto Functionality—Digital service, Sep. 5, 2003.

Internet printout—http:/www.anotofunctionality.com: Anoto Functionality—Software and additionals, Sep. 5, 2003.

Internet printout—http:/www.edgereview.com: The Edge—First Look: Digital Ink n-scribe, Sep. 5, 2003.

Internet printout—http:/www.techtv.com: Nscribe Pen and Presenter-to-Go, Sep. 5, 2003.

Internet printout—http:/www.pcmag.com: Jot This, Sep. 5, 2003.

Internet printout—http:/www.competitivetech.net: Competitive Technologies' Investee Introduces N-Scribe Pen, Sep. 5, 2003.

Internet printout—http:/www.flashcommerce.com: n-scribe For Digital Writing, Sep. 5, 2003.

Internet printout—http:/www.wired.com: The Hot New Medium: Paper, Sep. 5, 2003.

Internet printout—http:/www.gizmo.com: Maxell Digital Pen to use Anoto system, Sep. 5, 2003.

Internet printout—http:/www.anoto.com: Anoto® functionality brings digital life to paper products, Sep. 5, 2003.

Internet printout—http:/www.anoto.com: Pattern, Sep. 5, 2003.

Internet printout—http:/www.anoto.com: Construction, Sep. 5, 2003.

Internet printout—http:/www.anoto.com: Paper space, Sep. 5, 2003.

Internet printout—http:/www.anoto.com: Paper and Printing, Sep. 5, 2003.

Internet printout—http:/www.anoto.com: Page template, Sep. 5, 2003.

Internet printout—http:/www.anoto.com: Printers supporting Anoto functionality, Sep. 5, 2003.

Internet printout—Mimio—Digital Whiteboard Recorder, undated.

Internet printout—http:/www.mimio.com: Capture, Save and Share, Sep. 5, 2003.

Internet printout—http:/www.tabletpccorner.com: Auto Pen Bluetooth, Sep. 5, 2003.

Internet printout—http:/www.wacom.com: intuos2, Sep. 5, 2003.

Internet printout—http:/www.wacom.com: Penable Wacom, Sep. 5, 2003.

Internet printout—http:/www.wacom.com: tablet PC, Sep. 5, 2003.

Internet printout—http:/www.wacom.com: Cintiq—Interactive Pen Display, Sep. 5, 2003.

Internet printout—http:/www.wacom.com: Intuos2—the Professional Tablet, Sep. 5, 2003.
Internet printout—http:/www.wacom.com: Graphire2—Have more fun with digital phones, Sep. 5, 2003.
Internet printout—http:/www.smarttech.com: What's New, Sep. 5, 2003.
Internet printout—http:/www.smarttech.com: SMART Board Interactive Whiteboard, Sep. 5, 2003.
Internet printout—http:/www.smarttech.com: SMART Board Interactive Whiteboard—Front Projection Features, Sep. 5, 2003.
Internet printout—http:/www.smarttech.com: SMART Board Interactive Whiteboard—Q&A, Sep. 5, 2003.
Internet printout—SMART Board™ Interactive Whiteboard Specifications—Model 540, undated.
Internet printout—http:/www.smarttech.com: SMART Board Interactive Whiteboard Profiles—Sep. 5, 2003.
Internet printout—http:/www.smarttech.com: SMART Board Software Features—Sep. 5, 2003.
Internet printout—http:/www.smarttech.com: Press Releases—SMART launches Research Assistance Program, Sep. 5, 2003.
Internet printout—http:/www.smarttech.com: SMART Technologies, Inc. Press Releases, Sep. 5, 2003.
Internet printout—http:/www.smarttech.com: SMART Technologies, Inc., New annotation and software functionality on all SMART Board™ Interactive whiteboards, Sep. 5, 2003.
Internet printout—http:/www.smarttech.com: Carnegie Mellon research ranks the SMART Board™ interactive whiteboard as fastest, most accurate way to interact with projected information, Sep. 5, 2003.
Internet printout—http:/www.smarttech.com: SMART Camfire™ whiteboard camera system effortlessly saves dry-erase whiteboard notes, Sep. 5, 2003.
Internet printout—http:/www.smarttech.com: SMART Technologies Inc. awarded another U.S. patent for touch sensitive SMART Board™ technology, Sep. 5, 2003.
Internet printout—http:/www.mimio.com: Turn your whiteboard into an interactive whiteboard, Sep. 5, 2003.
Internet printout—http:/www.mimio.com: Mimio products, Sep. 5, 2003.
Internet printout—http:/www.mimio.com: Mimio technology, Sep. 5, 2003.
Brochure: VPEN, Revolutionizing human interaction with the digital world™, OTM Technologies, undated.
Internet printout—http:/www.ammagazine.com: RF Pen Sends Your Scribbles, Sep. 26, 2002.
Fujieda et al., Development of Pen-shaped Scanners, NEC vol. 51 No. 10, 1998.
A. Champaneria, "PADCAM: A Real-Time, Human-Centric Notetaking System" MIT Laboratory for Computer Science, Mar. 2002.
Internet printout—http:/www.is.cs.cmu.edu: Preprocessing in the Npen++ System, Aug. 8, 2002.
Internet printout—http:/www.is.cs.cmu.edu: Final input representation, Aug. 8, 2002.
Internet printout—http:/www.is.cs.cmu.edu: Npen++, Aug. 8, 2002.
J.L. Crowley et al., "Things That See", Communications of the ACM, vol. 43, No. 3, Mar. 2000.
B. Ko et al., "Finger Mouse and Gesture Recognition System as a New Human Computer Interface" Comput. & Graphics, vol. 21, No. 5, pp. 555-561, 1997.
Okada et al., "A High-Resolution Handwriting Character Input Device Using Laser Beams", 1981.
Sato et al., Video Tablet—2D Coordinate Input Device with OCD Camera, vol. J67-D No. 6.
Kai-Fu Lee, "Automatic Speech Recognition—The Development of the SPHINX System", Kluwer Academic Publishers, pp. 1-207, 1992.
Frederick Jelinek, "Statiscal Methods for Speech Recognition", The MIT Press, pp. 1-283, 2001.
English Translation of Document N (JP 06230886 A to Koga et al).
Sato, et al., "Novel device for Inputting Handwriting Trajectory," Ricoh Technical Report No. 27, Nov. 2001, pp. 52-59, http://www.ricoh.co.jp/rdc/techreport/No27/Ronbun/A2707.pdf.
Reynaerts, D., et al., "Design of an advanced computer writing tool," Micro Machine and Human Science, 1995, Proceedings of the Sixth International Symposium on Nagoya, Japan, Oct. 4-6, 1995, pp. 229-234.

* cited by examiner

UNIVERSAL COMPUTING DEVICE FOR SURFACE APPLICATIONS

This application is a continuation in part of U.S. patent application Ser. No. 10/284,417 filed Oct. 31, 2002, entitled "Universal Computing Device," the contents of which are herein incorporated by reference.

FIELD OF THE INVENTION

Aspects of the present invention are directed generally to a computer input device for generating smooth electronic ink. More particularly, aspects of the present invention are directed to an input device that may be used on divergent platforms, while providing a common user interface.

BACKGROUND OF THE INVENTION

Computing systems have dramatically changed the way in which we live. The first wave of computers was prohibitively expensive, and was only cost effective for use in business settings. As computers became more affordable, the use of personal computers both in the workplace and at home have become so widespread that computers have become as common as desks in the office and kitchen tables in the home. Microprocessors have been incorporated in all aspects of our daily lives, from use in television and other entertainment systems to devices for regulating the operation of our automobile.

The evolution of computing devices, from data crunching devices that occupied entire floors of large office facilities, to laptop computers or other portable computing devices, has dramatically impacted the manner in which documents are generated and information is stored. Portable computing capabilities have enabled individuals to type letters, draft memorandum, take notes, create images, and perform numerous tasks in places other than the office using these computing devices. Professionals and nonprofessionals alike are empowered to perform tasks while on the move using devices that fulfill their computing needs in any location.

Typical computer systems, especially computer systems using graphical user interface (GUI) systems, such as Microsoft® Windows, are optimized for accepting user input from one or more discrete input devices such as a keyboard (for entering text), and a pointing device (such as a mouse) with one or more buttons for activating user selections.

One of the original goals of the computing world was to have a computer on every desk. To a large extent, this goal has been realized by the personal computer becoming ubiquitous in the office workspace. With the advent of laptop computers and high-capacity personal data assistants, the office workspace has been expanded to include a variety of non-traditional venues in which work is accomplished. To an increasing degree, computer users must become masters of the divergent user interfaces for each of their computing devices. From a mouse and keyboard interface for the standard personal computer to the simplified resistive stylus interface of personal data assistants and even to the minimalistic keys of a cellular telephone, a user is confronted with a variety of different user interfaces that one needs to master before he can use the underlying technology.

Despite the advances in technology, most users tend to use documents printed on paper as their primary editing tool. Some advantages of printed paper include its readability and portability. Others include the ability to share annotated paper documents and the ease at which one can archive printed paper. One user interface that is bridging the gap between advanced computing systems and the functionality of printed paper is a stylus-based user interface. One approach for the stylus-based user interface is to use resistive technology (common in today's PDAs). Another approach is to use active sensors in a laptop computer. One of the next goals of the computing world is to bring the user interface for operating the computer back to the user.

A drawback associated with the use of a stylus is that such devices are tied to the computing device containing the sensor board. In other words, the stylus may only be used to generate inputs when used in conjunction with the required sensor board. Moreover, detection of a stylus is affected by the proximity of the stylus to the sensing board.

The use of whiteboards during a conference or presentation can greatly increase the amount that a potential viewer remembers. The ability to draw a plan, prepare a diagram, illustrate a trend via a whiteboard can help to bring everyone on a team, or even opposing parties, to a common understanding. During brainstorming sessions, an individual can jot various ideas down on a whiteboard. Unfortunately, when the process is complete, someone has to make a physical copy of the whiteboard content to retain the ideas. For example, a member of the team would have to copy everything on the board to a sheet of paper. Such a process is time consuming and wastes resources.

Advancements in whiteboard technology have led to the ability to make physical copies of the content memorialized on the whiteboard. Some whiteboards have a built in printer that allows a user to make a copy on the spot. However, such systems still only provide a hardcopy format and do not allow a user to send the content of the whiteboard to another device. Further still, specific edits by different people cannot be tracked, identification of different colors of the markers cannot be tracked, and thicknesses of strokes cannot be tracked.

SUMMARY OF THE INVENTION

Aspects of the present invention address one or more of the issues identified above, thereby providing a common user interface to users across divergent computing platforms. Aspects of the present invention relate to an input device for generating electronic ink, and/or generating other inputs, independent of the device for which the data is intended. The input device may be formed in the shape of a pen, and may or may not include an ink cartridge to facilitate movement of the input device in a familiar manner.

Another aspect of the invention provides a common user interface that is configured to operate with a whiteboard to track content provided on the whiteboard. An input device is configured to attach to a standard whiteboard marker and track all entries of information onto a whiteboard by that marker. The input device can track, for example, the input strokes, the width of the marker and the color of the marker. The input device can be configured to operate with conventional whiteboard markers. Another aspect of the invention provides encoded media to either be built into a whiteboard or to be generated onto a film, paper, or other medium for connection to a whiteboard, wall, or other surface. Still a further aspect of the invention provides a digital eraser to track eraser movements over a whiteboard to thereby erase digital ink from the electronic representation of the whiteboard content. The digital eraser allows for a conventional whiteboard eraser to be connected to the digital eraser. A camera built into the digital eraser tracks the movement of the eraser over the surface of the whiteboard or other surface.

The foregoing summary of aspects of the invention, as well as the following detailed description of various embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Aspects of the present invention relate to an input device that may be used in a variety of different computing platforms from controlling a desktop or laptop computer, writing on a whiteboard, controlling a PDA or cellular phone, or creating ink that may be ported to any of these platforms.

Terms

Pen—any writing implement that may or may not include the ability to store ink. In some examples a stylus with no ink capability may be used as a pen in accordance with embodiments of the present invention.

Camera—an image capture system.

Active Coding—incorporation of codes within the object or surface over which the input device is positioned for the purpose of determining positioning and/or movement of the input device using appropriate processing algorithms.

Passive Coding—detecting movement/positioning of the input device using image data, other than codes incorporated for that purpose, obtained from the object or surfaces over which the input device is moved using appropriate processing algorithms.

Input Device—a device for entering information which may be configured for generating and processing information.

Active Input Device—an input device that actively measures signals and generates data indicative of positioning and/or movement of the input device using sensors incorporated within the input device.

Passive Input Device—an input device for which movement is detected using sensors incorporated other than within the input device.

Computing Device—a desktop computer, a laptop computer, Tablet PC™, a personal data assistant, a telephone, or any device which is configured to process information including an input device.

Figure 1:
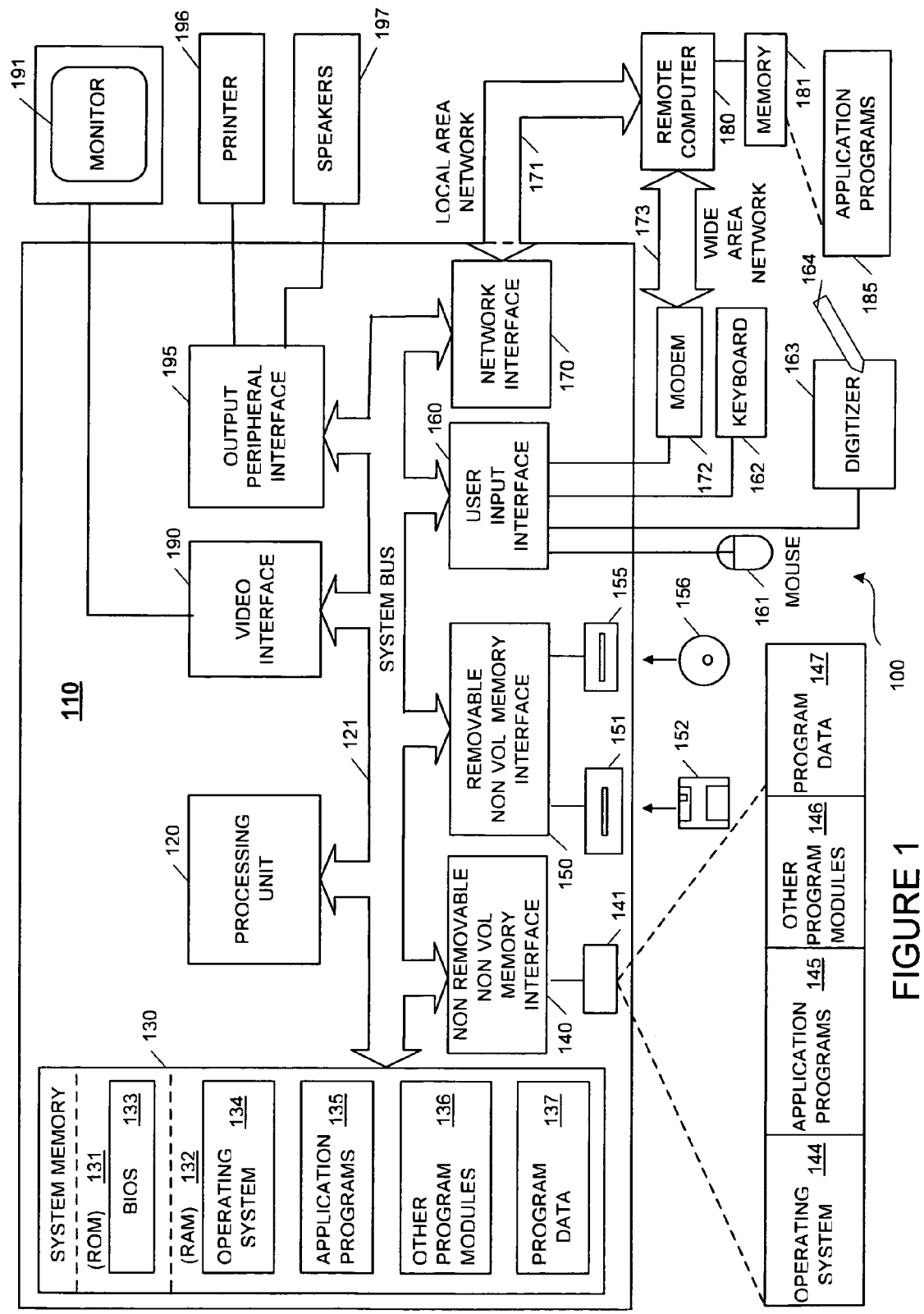
FIG. 1 illustrates a schematic diagram of a general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency or requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera (not shown), a keyboard 162, and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

In one embodiment, a pen digitizer 163 and accompanying pen or stylus 164 are provided in order to digitally capture freehand input. Although a direct connection between the pen digitizer 163 and the user input interface 160 is shown, in practice, the pen digitizer 163 may be coupled to the processing unit 120 directly, via a parallel port or other interface and the system bus 121 as known in the art. Furthermore, although the digitizer 163 is shown apart from the monitor 191, the usable input area of the digitizer 163 may be co-extensive with the display area of the monitor 191. Further still, the digitizer 163 may be integrated in the monitor 191, or may exist as a separate device overlaying or otherwise appended to the monitor 191.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
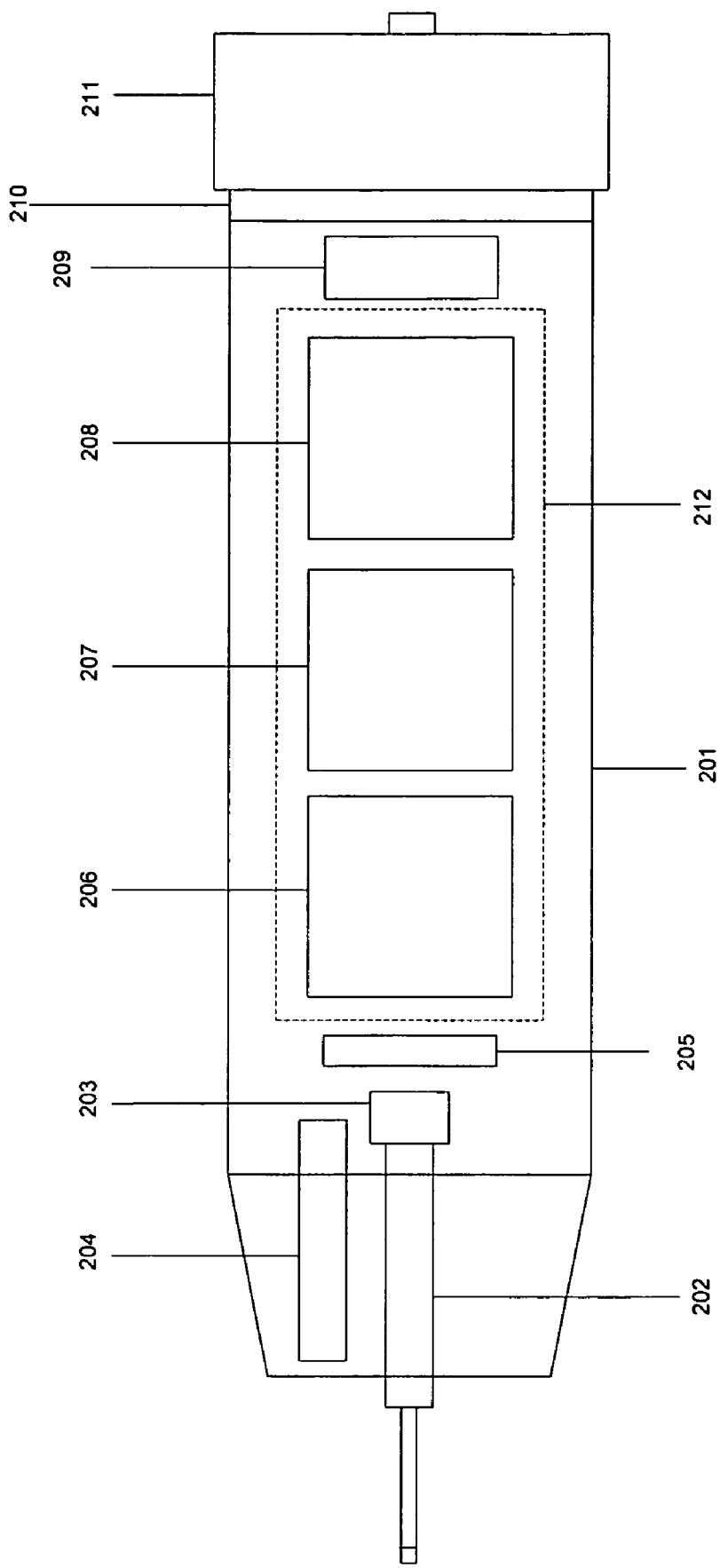
FIG. 2 illustrates an input device in accordance with a at least one aspect of the present invention.

FIG. 2 provides an illustrative embodiment of an input device for use in accordance with various aspects of the invention. The following describes a number of different elements and/or sensors. Various sensor combinations may be used to practice aspects of the present invention. Further, additional sensors may be included as well, including a magnetic sensor, an accelerometer, a gyroscope, a microphone, or any sensor for that might detect the position of the input device relative to a surface or object. In FIG. 2, pen 201 includes ink cartridge 202, pressure sensor 203, camera 204, inductive element 205, processor 206, memory 207, transceiver 208, power supply 209, docking station 210, cap 211, and display 212. The various components may be electrically coupled as necessary using, for example, a bus, not shown. Pen 201 may serve as an input device for a range of devices including a desktop computer, a laptop computer, Tablet PC™, a personal data assistant, a telephone, or any device which may process and/or display information.

The input device 201 may include an ink cartridge 202 for performing standard pen and paper writing or drawing. Moreover, the user can generate electronic ink with the input device while operating the device in the manner typical of a pen. Thus, the ink cartridge 202 may provide a comfortable, familiar medium for generating handwritten strokes on paper while movement of the pen is recorded and used to generate electronic ink. Ink cartridge 202 may be moved into a writing position from a withdrawn position using any of a number of known techniques. Alternatively, ink cartridge 202 may be replaced with a cartridge that does not contain ink, such as a plastic cartridge with a rounded tip, but that will allow the user to move the pen about a surface without damaging the pen or the surface. Additionally, an inductive element or elements may be included to aid in detecting relative movement of the input device by, for example, providing signals indicative of the input device in a manner similar to those generated by a stylus. Pressure sensor 203 may be included for designating an input, such as might be indicated when the pen 201 is depressed while positioned over an object, thereby facilitating the selection of an object or indication as might be achieved by selecting the input of a mouse button, for example. Alternatively, the pressure sensor 203 may detect the depressive force with which the user makes strokes with the pen for use in varying the width of the electronic ink generated. Further, sensor 203 may trigger operation of the camera. In alternative modes, camera 204 may operate independent of the setting of pressure sensor 203.

Moreover, in addition to the pressure sensor which may act as a switch, additional switches may also be included to affect various settings for controlling operation of the input device. For example, one or more switches, may be provided on the outside of the input device and used to power on the input device, to activate the camera or light source, to control the sensitivity of the sensor or the brightness of the light source, set the input device in a sketch mode in which conversion to text is not performed, to set the device to store the input data internally, to process and store the input data, to transmit the data to the processing unit such as a computing device with which the input device is capable of communicating, or to control any setting that might be desired.

Camera 204 may be included to capture images of the surface over which the pen is moved. Inductive element 205 also may be included to enhance performance of the pen when used as a stylus in an inductive system. Processor 206 may be comprised of any known processor for performing functions associated with various aspects of the invention, as will described in more detail to follow. Similarly, memory 207 may include a RAM, a ROM, or any memory device for storing data and/or software for controlling the device or processing data. The input device may further include a transceiver 208. The transceiver permits information exchange with other devices. For example, Bluetooth® or other wireless technologies may be used to facilitate communications. The other devices may include a computing device which may further include input devices.

Power supply 209 may be included, and may provide power if the pen 201 is to be used independent of and remotely from the host device, the device in which the data is to be processed, stored and/or displayed. The power supply 209 may be incorporated into the input device 201 in any number of locations, and may be positioned for immediate replacement, should the power supply be replaceable, or to facilitate its recharging should the power supply be rechargeable. Alternatively, the pen may be coupled to alternate power supplies, such as an adapter for electrically coupling the pen 201 to a car battery, a recharger connected to a wall outlet, to the power supply of a computer, or to any other power supply.

Docking station link 210 may be used to transfer information between the input device and a second device, such as an external host computer. The docking station link 210 may also include structure for recharging the power supply 209 when attached to a docking station, not shown, or connected to a power supply. A USB or other connection may removably connect the input device to a host computer through the docking station link, or through an alternative port. Alternatively, a hardwire connection may also be used to connect the pen to a device for transferring and receiving data. In a hardwired configuration, the docking station link would be omitted in favor of wiring connecting the input device directly to a host. The docking station link may be omitted or replaced with another system for communicating with another device (Bluetooth® 802.116, for example).

The input device 201 may further include a removable cap 211 which may be equipped with a metal tip for facilitating resistive sensing, so that input device 201 may be used with a device that includes a sensing board, for example. The shell of input device 201 may be comprised of plastic, metal, a resin, a combination thereof, or any material that may provide protection to the components or the overall structure of the input device. The chassis may include a metal compartment for electrically shielding some or all of the sensitive electronic components of the device. The input device may be of an elongated shape, which may correspond to the shape of a pen. The device may, however, be formed in any number of shapes consistent with its use as an input device and/or ink generating device.

Figure 3A:
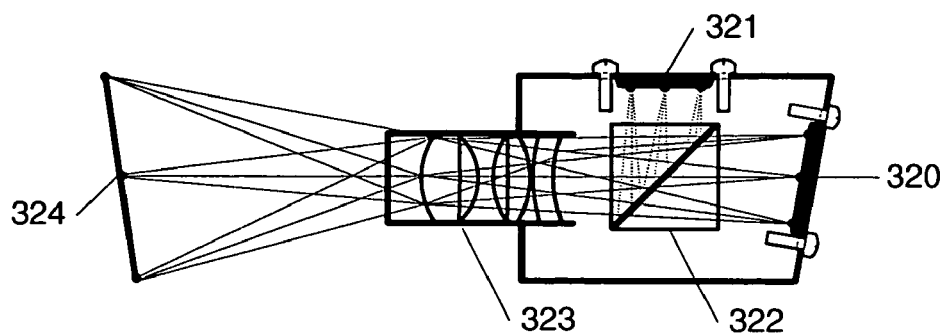
FIG. 3 shows three illustrative embodiments of a camera system for use in accordance with aspects of the present invention.
Figure 3B:
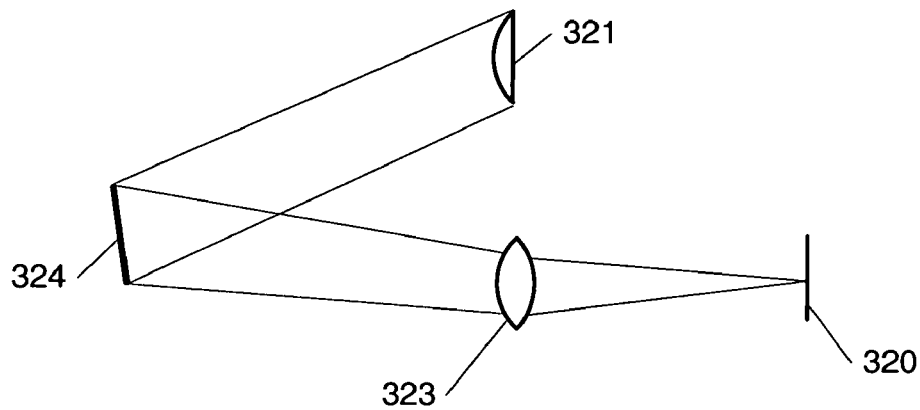
Figure 3C:
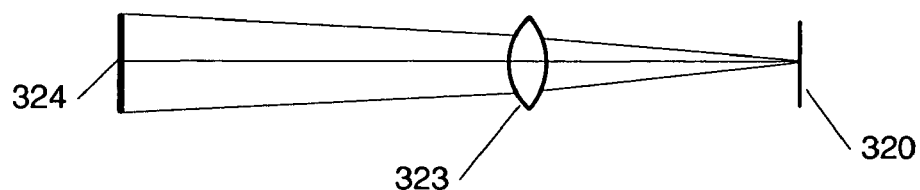

FIGS. 3A–3C show three illustrative embodiments of a camera for use in accordance with aspects of the present invention. As described, the input device 201 may be used to generate electronic ink by detecting movement of the pen using, for example, a camera. Camera 304 may be included to capture images of the surface over which the pen is moved, and through image analysis, detect the amount of movement of the pen over the surface being scanned. The movements may be correlated with the document and electronically transpose, add, or associate (e.g. store input annotations apart from the original document) electronic ink to the document.

As shown in FIG. 3A, in one embodiment, camera 304 includes an image sensor 320 comprised of, for example, an array of image sensing elements. For example, the camera may be comprised of a CMOS image sensor with the capability of scanning a 1.79 mm by 1.79 mm square area at a resolution of 32 pixels by 32 pixels. The minimum exposure frame rate for one such image sensor may be approximately 330 Hz, while the illustrative image sensor may operate at a processing rate of 110 Hz. The image sensor selected may comprise a color image sensor, a grayscale image sensor, or may operate to detect intensities exceeding a single threshold. However, selection of the camera or its component parts may vary based on the desired operating parameters associated with the camera, based on such considerations as performance, costs or other considerations, as may be dictated by such factors as the resolution required to accurately calculate the location of the input device.

A light source, 321, may illuminate the surface over which the input device is moved. The light source may, for example, be comprised of a single light emitting diode (LED), an LED array, or other light emitting devices. The light source may produce light of a single color, including white, or may produce multiple colors. A half mirror 322 may be included within the camera to direct light as desired. The camera 304 may further include one or more optical devices 323 for focusing light from the light source 321 onto the surface scanned 324 and/or to focus the light reflected from that surface to the image sensor 320.

As illustrated in FIG. 3A, light emitted from light source 321 is reflected by half-mirror 322, a mirror that reflects or transmits light depending on direction of the impinging light. The reflected light is then directed through lens system 323 and transmitted to the reflective surface below. The light is then reflected off of that surface, through lens system 323, strikes half-mirror 322 at a transmission angle passing through the mirror, and impinges on sensing array 320. Of course, cameras including a wide range of components may be used to capture the image data, including cameras incorporating a lesser, or a greater, number of components. Variations in the arrangement of components may also be numerous. To provide just one example, in simplified arrangement, the light source and the sensing array may be positioned together such that they both face the surface from which the image is to be captured. In that case, because no reflections within the camera are required, the half-mirror may be removed from the system. As shown in FIG. 3B, in a simplified configuration the light source 321 is positioned a distance from the lens 323 and sensor 320. In further simplified arrangement, as shown in FIG. 3C, the light source may be removed and ambient light reflecting off the object surface is focused by lens 323 onto the sensor 320.

Thus, variations in the components incorporated into the camera, or their placement, may be employed in a manner consistent with aspects of the present invention. For example, the placement and/or orientation of the camera and/or ink cartridge may be varied from that shown in FIG. 2 to allow for the use of a wide range of camera and/or ink configurations and orientations. For example, camera 304, or any of its component parts, may be located in openings adjacent that provided for the ink cartridge, rather than within the same opening as illustrated. As an additional example, camera 304 may be positioned in the center of the input device with the ink cartridge positioned to the side of the camera. Similarly, the light source 321 may be incorporated within the structure housing the remaining components of the camera, or one or more components may be positioned separate from the others. Furthermore, a light projecting feature may also be enabled, using a light source and/or optical system, with additional structure and/or software, or modifications to the illustrated components as necessary.

To aid in the detection and/or positioning of the input device, the surface of an object over which the input device is positioned may include image data that indicates the relative position of areas of the surface. In one exemplary embodiment, the surface being scanned may comprise the display of a host computer or other external computing device, which may correspond to the monitor of a desktop computer, a laptop computer, Tablet PC™, a personal data assistant, a telephone, digital camera, or any device which may display information. Accordingly, a blank document or other image generated on the screen of a Tablet PC™ may include data corresponding to a code that represents the relative position of that portion of the document within the entire document, or relative to any other portion of the image. The information may be comprised of images, which may include alphanumeric characters, a coding pattern, or any discernable pattern of image data that may be used to indicate relative position. The image or images selected for use in designating the location of areas within the surface of the object may depend on the sensitivities of the scanning device incorporated into the camera, such as the pixel resolution of the sensor, and/or the pixel resolution of the image data contained within the surface being scanned. The location information extracted from the object may then be used to track movement of the input device over the object. Using that information, electronic ink or other information corresponding to movement of the input device may be accurately generated. Location information may be used to both detect the position within the image at which the input is to be affected, as well as to provide an indication of movement of the input device over the object surface. The resulting information may be used interactively with word processing software to generate changes in a document, for example.

In an alternate embodiment, the object used in combination with the input device may be composed of paper with positional information included in the background, for example. The positional information may be incorporated in any form of code, optical representation, or other form that may be sensed by a sensor associated with the input device and used to represent the relative location of the specific site on the paper.

Figure 4:
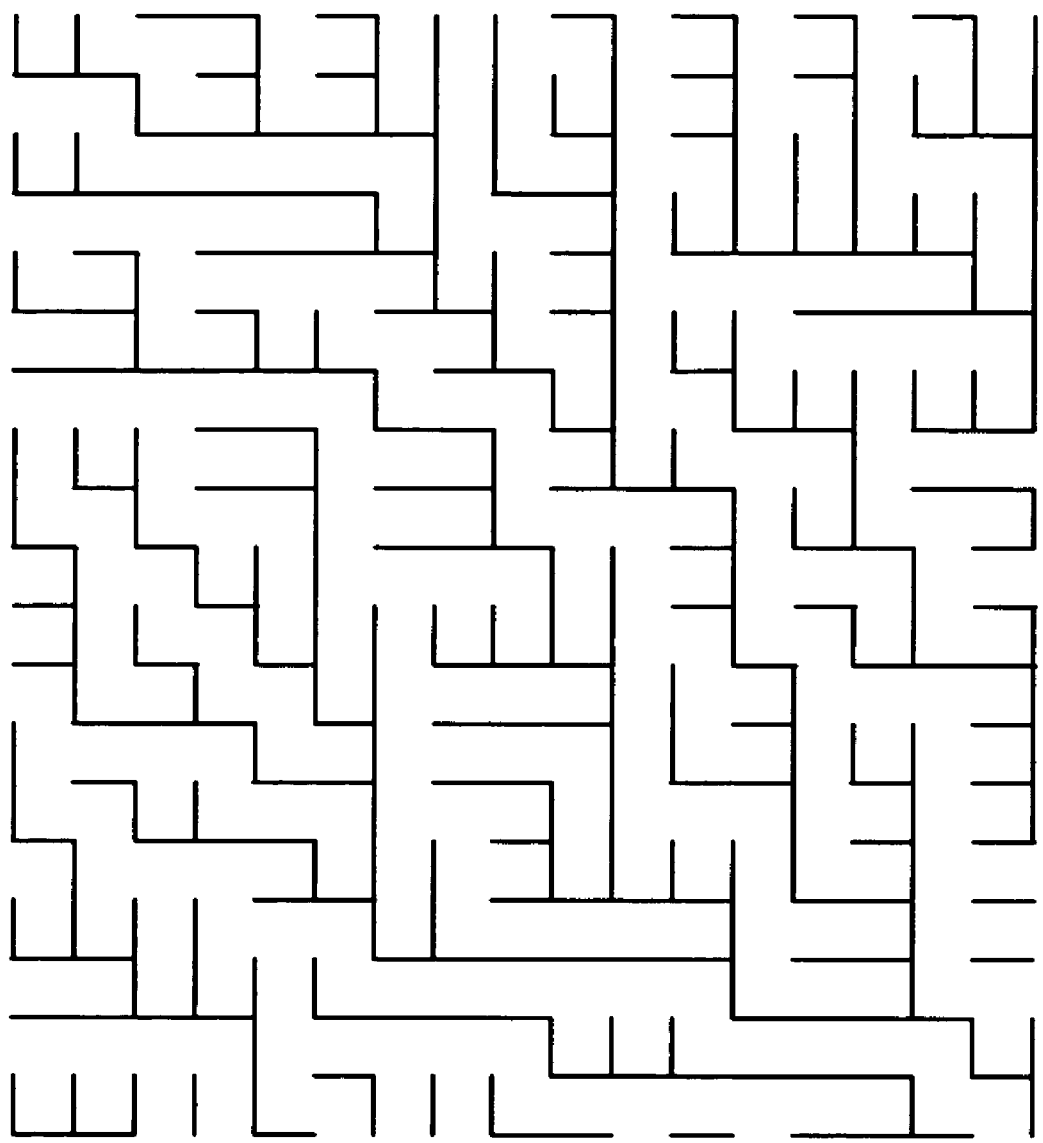
FIG. 4 illustrates an illustrative technique (maze pattern) for encoding the location of a document.

FIG. 4 illustrates an illustrative technique for encoding the location of the document. In this example, the background of the image may include thin lines that, when viewed in large groups form a maze-like pattern. Each grouping of lines within the maze design, comprised of a few thin lines with unique orientations and relative positions, for example, may indicate the position of that portion of the maze pattern relative to other portions of the document. Decoding of the maze pattern found in a captured image may be performed in accordance with numerous decoding schemes. In one embodiment, a particular arrangement and grouping of lines may be decoded to generate positional information. In another embodiment, an indication of the position of the captured data may be derived by extracting a code from the image corresponding to the sampled pattern, and using that code to address a look-up table containing data identifying the location of that area. Reference to the coding technique employing a maze pattern is provided for illustrative purposes, and alternative active coding techniques, including, but not limited to the visual coding techniques in U.S. patent application Ser. No. 10/284,412 filed Oct. 31, 2002, entitled, "Active Embedded Interaction Code," the contents of which are incorporated herein by reference, may also be used consistent with aspects of the invention.

Even in the absence of location codes, images captured by the image sensor may be analyzed to determine the location of the input device at the time of image capture. Successive images may be used to calculate the relative positions of the input device at different times. Correlation of this information may yield an accurate trace of the input device over the substrate. Using this trace information electronic ink accurately representing handwritten strokes may be generated, for example.

Figure 5:
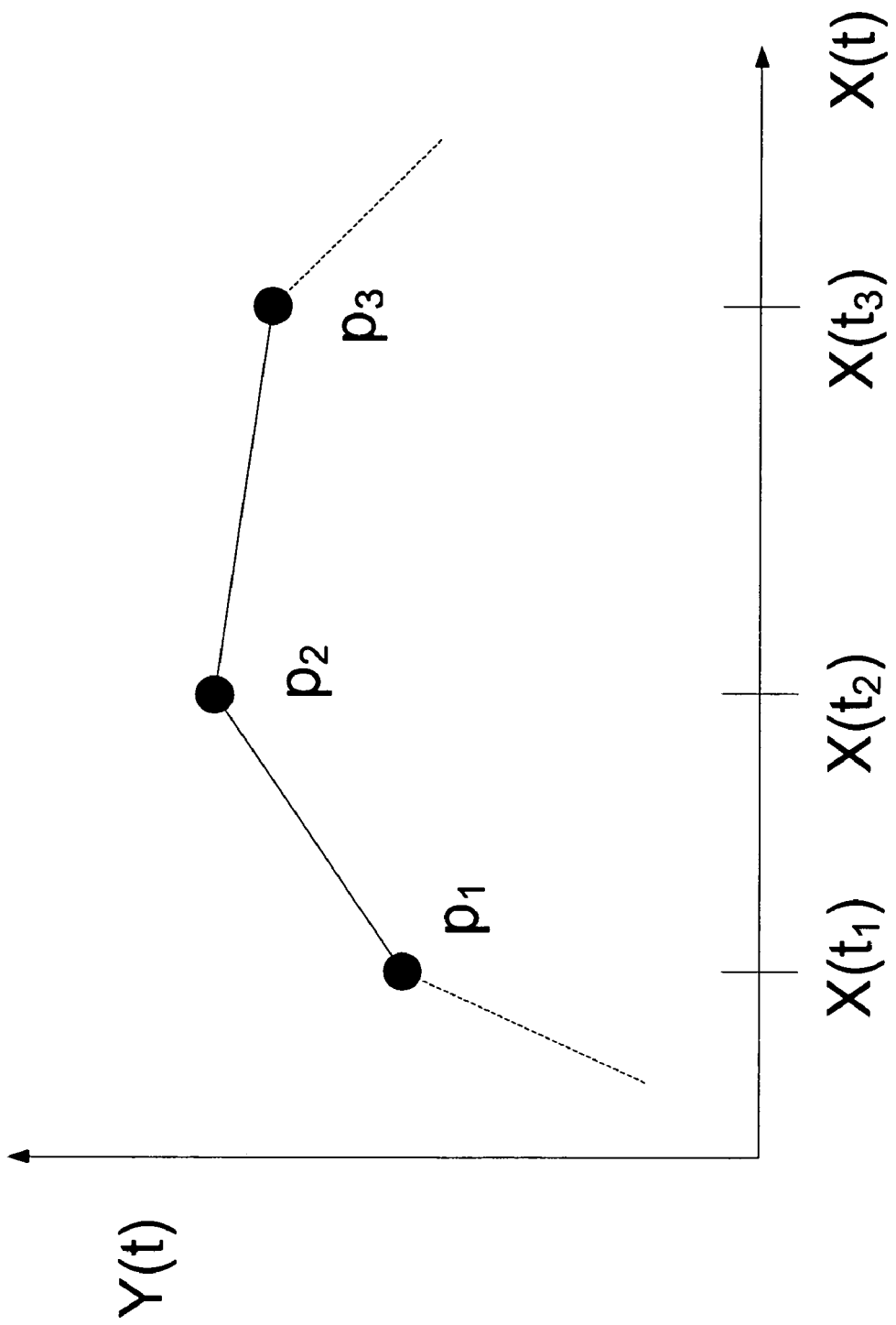
FIG. 5 provides an illustration of a trace pattern from which electronic ink may be generated.

FIG. 5 provides an illustration of a trace pattern from which electronic ink may be generated. In this example, a first captured image may contain a portion of a maze pattern indicative of a first position $p_1$ of the input device at a first time, $t_1$. The next captured image may contain a portion of the coded image data, a different portion of the maze pattern in this example, providing location information of a second position $p_2$ at a second time, $t_2$. A third captured image may contain a third portion of the maze pattern, thereby indicating positioning of the input device at a third position $p_3$ at time $t_3$. Using this data, the three points may indicate a trace of the input device from time $t_1$ through $t_3$. Applying algorithms for estimating the inking pattern traced by the input device, electronic ink may be generated. The complexity of the algorithm applied may dictate the accuracy of the ink generated. For example, a basic inking algorithm may simply connect the dots with straight lines of unvarying thickness. Algorithms factoring previous sampling points, the time between samplings or other data indicative of the velocity or acceleration at which the input was moved, data indicative of the depressive force used, or any other relevant data, may be processed to provide ink that more accurately represents the actual movement of the input device (for example, from other sensors).

Optical scanning performed by camera 304 may generate data necessary to determine the position of the input device at various times and that information may be used to generate electronic ink. In one illustrative embodiment, comparisons of the image captured at time $t_1$ with that of the image captured at time $t_2$ may provide data indicating the distance of movement of the pen from one point to another during the period $t_1$ to $t_2$. Those two points of data, and/or the relative distance moved, may then be used to generate a trace of the movement of the input device for generating electronic ink representative of handwritten strokes. Comparisons of two or multiple images, or portions of captured images, for calculating the relative movement, might be accomplished by a difference analysis. In that case, features appearing in more than one image may be compared and the relative movement of the feature or features from one location to another within those images may provide an accurate indication of pen movement, for example. Should an irregular sampling period be used, the processing algorithm may be modified to compensate for variations in the sampling period to more accurately indicate the correlation between movement of the input device with the actual time required for each movement. Information indicative of the velocity of motion may assist in generating ink of the appropriate thickness.

In accordance with such an embodiment, the surface over which the input device is moved may include the display of a computing device, a mouse pad, a desktop, or any non-uniform reflective surface from which objects or image data may be extracted indicating movement of the input device over that surface. The tracking algorithm with which the captured image data may be processed may be fixed or may vary dependent on the characteristics of the images captured. Using a simple tracking algorithm, the processor may detect grains in the wood of a desktop, for example, and based on a comparison of a sequence of images captured by the camera, the relative location of particular patterns of grain within successive images may be used to determine the location of the input at various times and/or the relative movement of the input device over that surface. A more complex tracking algorithm may be required where features within the images are less easily discerned and the image more uniform. Alternative passive coding techniques, including, but not limited to, the coding techniques found in U.S. patent application Ser. No. 10/284,451 filed Oct. 31, 2002, entitled, "Passive Embedded Interaction Code," the contents of which are herein incorporated by reference, may also be employed consist with aspects of the invention.

Figure 6A:
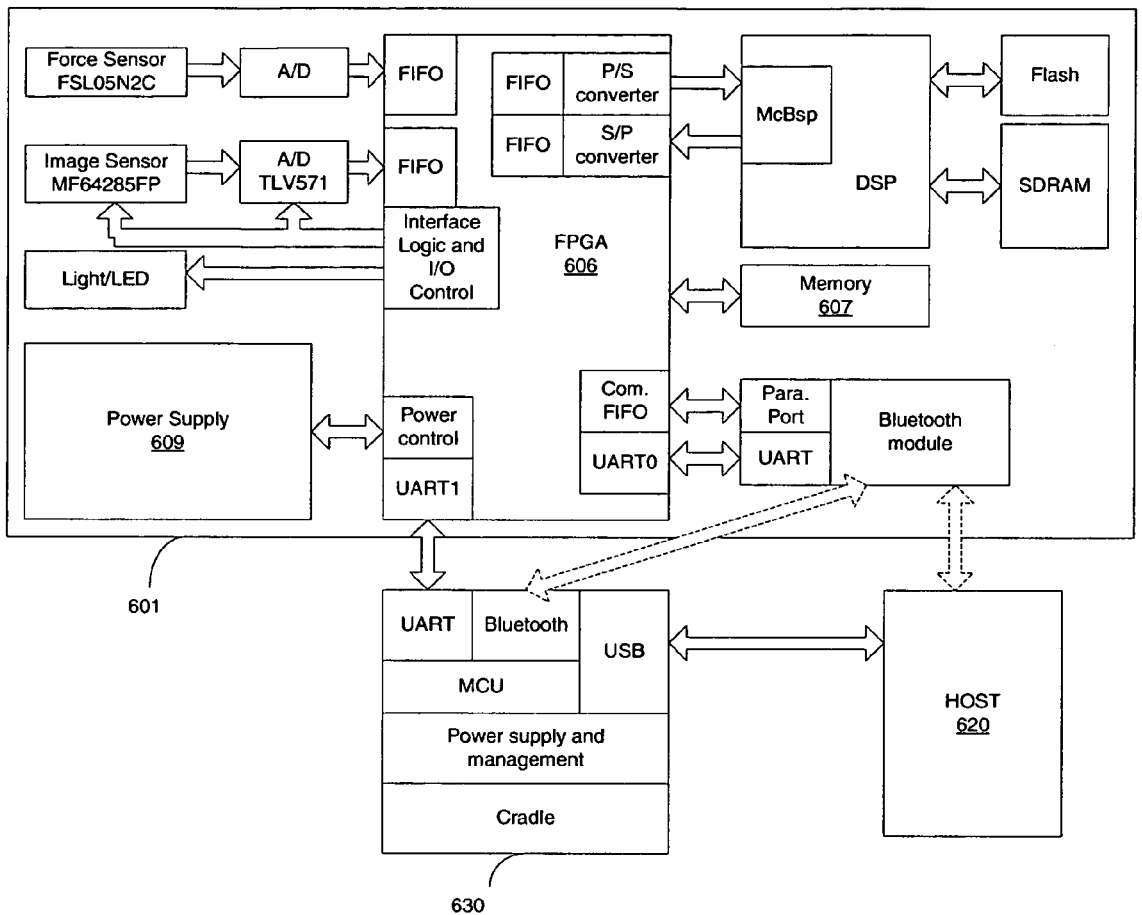
FIGS. 6A and 6B show an illustrative hardware architectures of a system in accordance with at least one aspect of the present invention.

FIG. 6A shows a hardware architecture of a system in accordance with one embodiment of the present invention. Many of the same or related components illustrated in previous embodiments will be represented using like reference numerals. Processor 606 may be comprised of any known processor for performing functions associated with various aspects of the invention. For example, the processor may include an FPSLIC AT94S40, and may be comprised of an FPGA (Field Programmable Gate Array) with an AVR core. That particular device may include a 20 MHz clock and operate at a speed of 20 MIPS. Of course, selection of a processor for use in input device 601 may be dictated by the cost and/or processing speed requirements of the system. The processor 606 may perform image analysis, should such analysis be conducted within the input device. Alternatively, processing may be performed by a second processor, such as a digital signal processor (DSP) incorporated into the device 601. The processor 606 may further operate to perform steps critical to reducing power consumption to conserve power stored in power supply 609, such as powering down various components when the input device is inactive, which may be based on data indicating movement and/or positioning of the device. The processor 606 may further operate to calibrate and regulate the performance of various components, including adjustments to the intensity of light source or to the sensitivity of the sensing array of camera, for example. Also, the processor, or a coupled digital signal processor, may choose from among a plurality of stored image processing algorithms, and may be controlled to select the image analysis algorithm most suitable for detecting movement, in accordance for example, characteristics associated with the surface over which the device is moved. Thus, the image processing algorithm may be selected automatically based on performance considerations programmed into the input device. Alternatively, the input device may be controlled, and settings established, based on inputs selected by a user, for example, via actuations of the force sensor or inputs on the input device, or based on handwritten strokes corresponding to commands.

In one embodiment, memory 607 may include one or more RAMs, ROMs, FLASH memories, or any memory device or devices for storing data, storing software for controlling the device, or for storing software for processing data. As noted, data representing location information may be processed within the input device 601 and stored in memory 607 for transfer to a host computer 620. Alternatively, the captured image data may be buffered in memory 607 within the input device 601 for transfer to a host device 620 for processing or otherwise.

Transceiver, or communication unit, may include a transmission unit and receiving unit. As noted, information representing movement of the input device, either processed into a form suitable for generating and/or displaying electronic ink or otherwise, may be transmitted to a host computer 620, such as the previously described desktop computer, laptop computer, Tablet PC™, personal digital assistant, telephone, or other such device for which user inputs and electronic ink might be useful. The transceiver may communicate with an external device using any wireless communication technique, including Bluetooth® technology, for performing short-range wireless communications, infrared communications, or even cellular or other long range wireless technologies. Alternatively, the transceiver may control the transmission of data over a direct link to a host computer, such as over a USB connection, or indirectly through a connection with docking cradle 630. The input device may also be hardwired to a particular host computer using a dedicated connection. The transceiver may also be used to receive information and/or software, which in one embodiment, may be used for improving performance of the input device. For example, program information for updating the control functions of the processor may be uploaded via any of the previously described techniques. Moreover, software may also be transmitted to the input device, including software for analyzing the image data and/or for calibrating the input device may be downloaded from an external device.

Processor 606 may operate in accordance with an interaction model. An interaction model may be implemented in the form of software for maintaining a consistent experience in which electronic ink is generated regardless of the external device for which the unit performs the functions of an input device. The interaction model may process captured data for conversion into a form universally suitable for use on any number of host devices including a desktop computer, a laptop computer, Tablet PC™, a personal data assistant, a telephone, a whiteboard, or any device that might store, display or record data input via the input device. The processor 1106 may recognize the device to which it is connected, or for which the data representing handwritten inputs are intended, and based on such recognition, select processing that converts input data into a form suitable for the specific device recognized. In that case, a conversion to a form useful for each potential recipient computing device would be contained within the input device and made available as necessary. Recognition of the intended recipient device may be attained as a result of communication between the devices, should they be connected wirelessly or directly. Alternatively, the user may enter the identity of the device or devices for which the data is intended directly into the input device. Of course, if the input device includes a display, data may be processed using a default processing algorithm suitable for use with the display and/or a multitude of other devices.

Figure 6B:
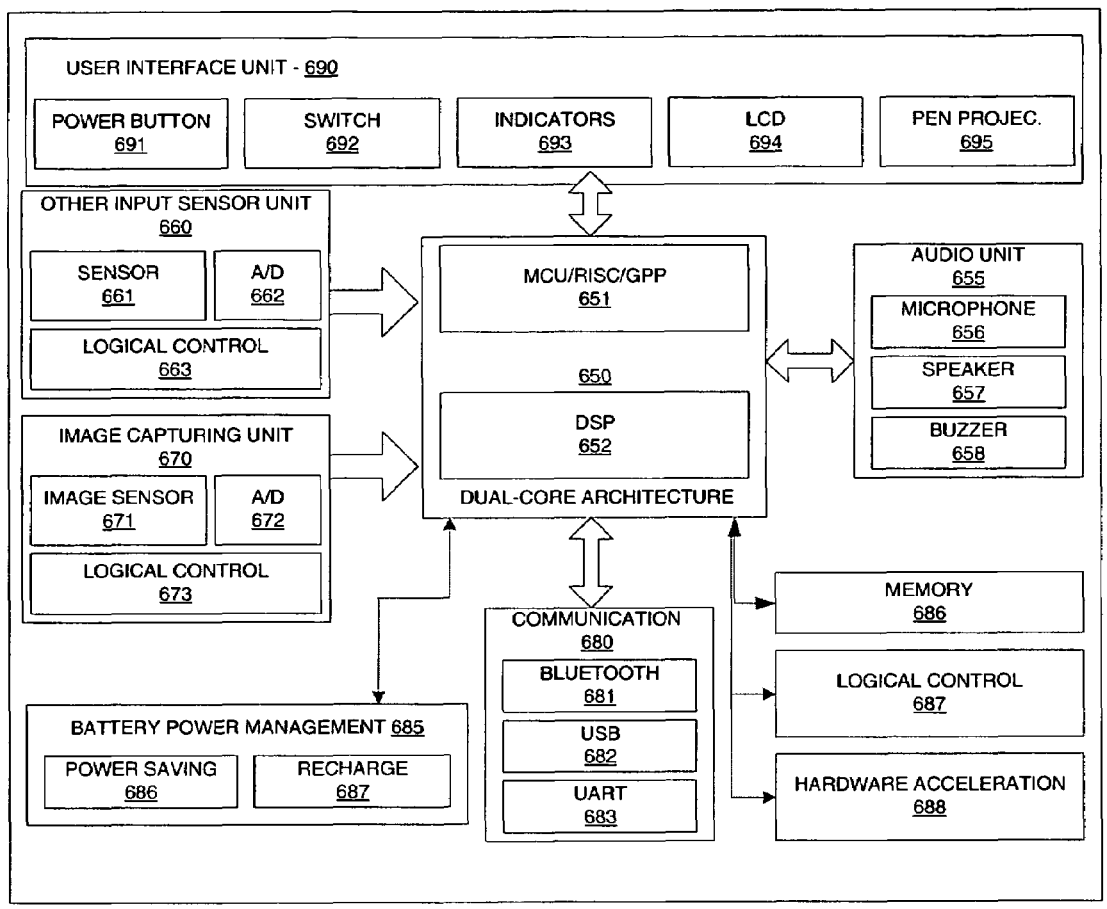

FIG. 6B shows another hardware architecture of a system in accordance with at least one aspect of the present invention. The hardware architecture may be a suite of printed circuit boards (PCBs) and firmware running on the PCBs. The components of the suite of PCBs include a dual core architecture component 650, an other input sensor unit 660, an image capturing unit 670, a communication component 680, an audio unit 655, a user interface unit 690, memory 686, logical control 687, and a hardware acceleration component 688. It should be understood by one skilled in the art that the following boards and their description are not all necessary for the present invention and one or more components may be included for operation of the present invention.

The dual core architecture component 650 includes a RISC (Reduced Instruction Set Computer) or GPP (General Purpose Processor) 651 used for running an embedded OS (Operating System), such as Windows CE®. DSP (Digital Signal Processor) 652 is in charge of running algorithms, such as image processing, maze pattern analysis and m-array decoding. The two cores may be two different chips or built into one chip. MCU/RISC/GPP component 651 may have several sensors and A/D (analog to digital conversion) chips operating simultaneously. The sensors and A/D chips need to be configured and controlled at the same time. MCU/RISC/GPP component 651 can handle system control, computation, and communication because MCU/RISC/GPP component 651 is suitable for real-time parallel computing. One example of MCU/RISC/GPP component 651 may include three chips: XCV50CS144, an FPGA chip from Xilinx of San Jose, Calif. with 50K logic gates and 96 user IOs; XC18V01, a configuration PROM from Xilinx of San Jose, Calif.; and CY62256V, a 32KX8 SRAM (static RAM) from CYPRESS of San Jose, Calif., as buffer for computation.

DSP (Digital Signal Processor) component 652 may consist of two chips. The TMS320VC5510 is a high-performance, low power-consumption, fixed-point DSP chip from Texas Instruments (TI) of Dallas, Tex. Such a chip is very suitable for mobile computing devices. This chip is used for computation to recover strokes as written by the user. The second ship of the DSP component 652 may be the SST39LF160, a 16M bit multi-purpose flash memory from SST of Sunnyvale, Calif. This non-volatile, reliable, compact storage chip is used to store DSP firmware and computation result.

Two input units include the other input sensor unit 660 and the image capturing unit 670. These units generate force and image signals that are outputted to the dual architecture component 650 respectively. Other input sensor unit 660 may include a FSL05N2C, a force sensor chip 661 from Honeywell of Morristown, N.J., a MAX4194, instrumentation amplifier 663 from MAXIM of Sunnyvale, Calif., and a MAX1240, a 12-bit serial A/D converter 662 from MAXIM of Sunnyvale, Calif. Other input sensor unit 660 is configured to sense subtle force changes, in 12-bit precision, at up to about 100K samples per second. Precise force data is needed to indicate whether the input device is being used for writing or how hard the user is pushing the input device while writing. Image capturing unit 670 may include a MF64285FP, a 32×32-pixel image sensor chip 671 from Mitsubishi of Tokyo, Japan, a TLV571, an 8-bit A/D converter 672 from TI of Dallas, Tex., and a logical control component 673. Image capturing unit 670 can capture images at up to 336 fps (frame per second). A minimum 32*32-pixel resolution image sensor is chosen, because a lower resolution cannot capture enough features for processing. Image sensor 671 is a high speed, small sized, low power-consumption image sensor. Image capturing unit 670 may include additional sensors for capturing image data from multiple areas. For example, an input device employing two image sensors 671 may be used for operation with a whiteboard. One image sensor 671 can be configured to capture data representative of the writing of a user. A second image sensor 671 may be configured to scan an indicator, such as a bar code, of a whiteboard pen. In such an example, the bar code of the whiteboard pen may include information pertaining to the color and/or thickness of the whiteboard pen. The second image sensor 671 can capture this data to identify that a user is using a blue whiteboard pen and has a thickness of 1.5 cm.

Communications component 680 may include a WML-C09 chip 681 and an antenna. WML-C09 chip 681 is a Class 2 Bluetooth® module from MITSUMI of Tokyo, Japan. The Bluetooth® chip enables an input device to communicate with a host PC at a speed of 720K bps (bits per second) or 100 frames per second within a range of 10 meters. Bluetooth® is a low cost, low power cable replacement solution with industry wide support, which is suitable for use with the present invention. Each Bluetooth® module is assigned a specific and/or unique Bluetooth® address which can be used to identify the input device itself. Communication component 680 may include a USB port 682 and a UART component 683.

Battery power management component 685 is designed to generate all necessary voltages, for example, 5V, 3.3V, 2.5V, 1.6V, from a supplying Li-ion battery. A 5V supply may be used by image sensor 671 and force sensor 661. A 2.5V supply may be used by the MCU/RISC/GPP component 651 for internal power. A 1.6V supply may be used by the DSP component 652 for internal power. A 3.3V supply may be used by other components, such as for the communication component 680. Power saving component 686 conserves the operational life of the battery power and recharge component 687 recharges the battery power of the input device. Over-discharge protection is also designed to prevent the battery from being damaged. Battery power management component may include the following chips: UCC3952PW-1 from TI of Dallas, Tex. and MAX9402SO8 from MAXIM of Sunnyvale, Calif., together to realize over-discharge protection; TPS60130PWP from TI of Dallas Tex., to generate a 5V supply output; TPS62006DGSR from TI of Dallas, Tex., to generate a 2.5V supply output; TPS62000DGSR from TI of Dallas, Tex., to generate a 1.6V supply output; and TPS62007DGSR from TI of Dallas, Tex. and/or TPS79333 from TI of Dallas, Tex., to generate a 3.3V supply output.

Audio unit 655 provides for audio interface components of the input device. Audio unit 655 may include a built-in audio player system, such as an MP3 player. Microphone 656 permits voice recording capabilities while using the input device. Speaker 657 can output audio from a variety of sources, including a built-in and/or external MP3 player, a multi-media file, an audio file, and or/some other audio source. Buzzer 658 may be an audible indicator for a user, such as an illegal operation indicator and/or low battery power indicator.

User interface unit 690 provides various user interface elements for communication to and from a user. Power button 691 permits a user to turn the input device on or off and can also be configured to enter into a sleep, standby, or low power mode for conservation of battery power. Functional button/switch 692 can be used as a command input to the input device. Functional button/switch may be an actuatable button for choosing an element in an application program with which the input device operates. Indicators 693 may be LEDs (light emitting diodes) and/or other optical outputs for visual communication with a user. Indicators 693 may change colors, intensity, and/or pulse rate. For example, indicator 693 may change colors when input device changes to a low power mode. LCD (liquid crystal display) 694 may be a mini display that outputs visual information to user. For example, LCD 694 may indicate that the battery is low on the user interface by showing "LO BAT" on the display. Pen projection 695 permits the projection of an image onto a surface. Pen projection 695 provides additional visual information to a user of the input device.

Memory 686 allows for storage of any type of information, including force sensor 661 and image sensor 671 data and operational instructions for a particular application program with which the user interface may operate. Logical control 687 may be used to control peripheral devices. Logical control 687 may be an FPGA or a CPLD (complex programmable logic device). Hardware acceleration unit 688 may be configured to accelerate algorithms in order to increase efficiency of computations of the input device.

Figure 7:
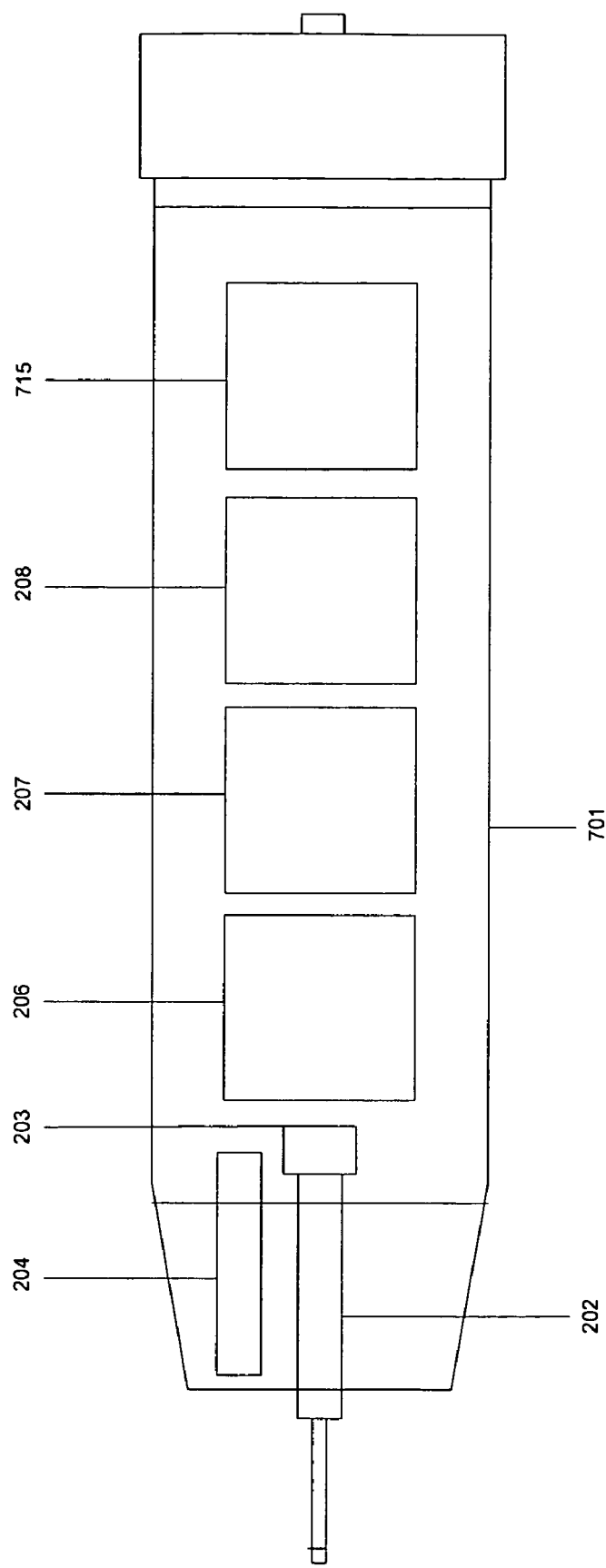
FIG. 7 illustrates a further combination of components incorporated in an input device for generating electronic ink in accordance with another illustrative embodiment.

As illustrated in FIG. 7, input device 701 also may include one or more inertial sensors 715 for sensing pen movement, position, or orientation, in addition to the previously described components represented with like reference numerals. For example, input device 701 may include a gyroscope for providing data representing the angular velocity of the pen in a plurality of directions. The input device 701 may include one or more accelerometers, or sets of accelerometers, measuring the acceleration or gravitational forces upon the pen. Data representing movement of the pen may also be obtained using a magnetic sensor which measures movements of the pen by detecting variations in measurements of the earth's magnetic field, described herein as an inertial sensor because it detects movement of the input device based on data other than image data. Data from either or any of the inertial sensors incorporated with or into the input device, which may include gyroscopes, accelerometers, magnetic sensor, inductive elements or any device or devices for measuring movement of the input device, may be used in combination with data from the camera to obtain data representing movement or positioning of the input device, and thereby produce data for generating electronic ink.

As noted, a surface of an object over which the input device is positioned and/or moved may include coded image data that indicates the location or relative position of each area within that surface. The object may comprise the display of a computing device, such as a laptop computer. In one embodiment, a document may be recalled from memory and displayed on the screen. Imbedded within that document, such as in the background, may lie coded information indicating the position of each area of the document. For example, the background of the document may include a maze pattern, a sufficiently large enough portion of that pattern uniquely identifying each region within the entire document. The input device may be used in combination with the coded location information to add annotations or edits to the document at specified locations even if the display of the laptop does not include sensors for detecting movement of an input device over a screen. Thus, the input device may function as an "active input device" such that sensors associated with the input device generate data indicative of position or location of that device.

In one example, the image sensor incorporated within the input device captures image data representing the surface of the display screen over which the input device is positioned and/or moved. The sensor captures images including location codes indicating the relative position of the input device. As the user moves about the displayed image, entering annotations and/or making edits to the electronic document displayed, the input device generates signals representing those inputs and data representing the location within the document at which those inputs are to be incorporated. Control of the laptop may be also affected using the input device, in place of a mouse, or to perform other standard inputs function including the movement of a cursor and the actuation of selections.

The input device may be used in conjunction with word processing software to edit the document by, for example, deleting text and inserting new text. To edit the document displayed on the screen of a computing device, a user positions the input device over the screen at the desired location. To delete text, the user may position the input device proximate the screen and move the device in a motion to strike through the image of the text displayed. By sensing the location codes, the image may be processed to determine both that the pen has been moved in a striking motion, and to identify the text corresponding to the location at which the user moved the input device. Accordingly, the inputs may be used to delete that data.

Next, the user may wish to insert new text. In a familiar manner, the user may draw a symbol for inserting text, such as a "carrot" or upside-down "V", at the location at which the new text is to be inserted. Processing software for converting inputs into image data and/or commands, stored in the input device or host computer, recognizes the symbol as a control signal for inserting text. With the aid of the input device, the user may then write text to be inserted by hand.

In an alternative embodiment, the user may add notes with highlighting indicating the original text to which the annotations pertain. For example, the user may select the text to be highlighted using a pull-down menu, or a highlighting button, displayed on the screen. Next, the input device is dragged over text to be selected for highlighting. Then comments to be associated with the highlighted/selected text may be written on the screen of the display at a location adjacent the highlighted text. When the operation is complete, the user may select the prompts necessary for completing entry of annotations. All of these modifications to the document may be created using the input device regardless of whether the display includes sensors for detecting movement of the input device.

Modifications to the document may be displayed and/or incorporated within the document in the form of image data, electronic ink or data converted into text. Conversion of the inputs into text may occur in a manner invisible to the user, such that text appears in the display of the document on screen as it is entered. Alternatively, the handwriting of the user may appear within the body of the document. To achieve instantaneous display of edits, information representing the movement of the pen and the location of such edits may be transmitted to the laptop device on an ongoing basis.

In operation, the input device captures 32×32 pixel resolution images of the surface over which input device is moved and 12-bit precision force data indicating if the input device is used writing or how hard the user is pushing the input device while writing. The image and force data are packaged together into a frame. Then the continuous frame stream is transmitted wirelessly using Bluetooth® at up to 100 frames per second. The input device starts an auto-initialization procedure when powered up and then turns into working mode or standby mode. The input device switches modes in run-time according to the magnification of the pressure value, that is, switches to working mode if the pressure value is larger than a given threshold, else standby mode.

While operating in a working mode, the input device consumes about 120 mA current. Frame data is generated in the other input sensor unit, such as 660 and image capturing unit, such as 670, and outputted to the dual core architecture, such as 650. The dual core architecture receives the image and force data, frames them (image compression, CRC coding, time stamping, framing), and transmits the data to the communication unit, such as 680, for communication with a host PC. Communication unit also provides a high speed UART, such as 683, connecting to a RS-232 at the host PC directly for debugging purpose. The operations in the dual core architecture 650 include data framing, image compression, time stamping, CRC coding, and transmission links control (via UART or Bluetooth).

As noted, the identity of the person entering the inputs may also be recorded. For example, the input device may generate information identifying the user and/or the particular input device. The identity information may be attached to the generated input data. Alternatively, such identification information may be provided as a separate signal transmitted to the host device.

While the above illustrative embodiment identifies the surface over which the input device is moved as the display of a laptop device, the input device may also function to detect positioning using codes incorporated within a surface of any object over which the device may be moved. Thus, an image incorporating location codes may be created and/or editing using the input device in combination with the monitor of a desktop computer, Tablet PC™, a personal data assistant, a telephone, or any device which may display information. Coded information may also be incorporated within a transparent sheet laid over the display screen of such devices, or incorporated within a surface that may be used in combination with a display, including protective films.

Coded information may also be incorporated on a writing surface or on writing material, such as paper, to uniquely identify the locations on that surface. For example, positional information may be incorporated in the background of the paper. As noted, the positional information may include any form of indication or code representing the relative location of the specific site on the paper. Accordingly, the input device may be used in association with coded paper to record information corresponding to the handwriting of a user at the appropriate location. For example, armed with only the input device and a writing surface incorporating coded position information, while riding in a taxi, the input device may be used to draft a letter to a client. Writing on paper with the input device, gestures corresponding to text or other input information are recognized by detecting changes in the location of the input device at certain times. The inputs may then be converted into electronic ink or other electronic data for use in generating information corresponding to those gestures. Conversion of the inputs may be performed as those inputs are generated, either within the input device or if received by a host computing device coupled to the input device. Alternatively, such conversion may be performed at a later time. For example, the information generated using the input device may be stored in memory and transmitted to a recipient and/or host computer for suitable processing at later time.

Data generated using the input device, whether those inputs are handwritten letters, symbols, words or other written images, may be incorporated into a document at locations identified by the location codes. Thus, even in the absence of a formatted template, the layout of a document, such as the previously described letter, may be achieved using the location information identifying the location within the document at which the information is to be entered. For example, the address of the drafter, address of the recipient, body and closing of the letter, and remaining components, may be entered on the paper at the appropriate location. Using the coded location information captured by the camera, the words or other images forming the contents of the corresponding electronic document are incorporated at the appropriate locations.

Using detected location information, the input device may also interact with the host computing device for entering commands and making selections and the like. Where the computing device is a portable camera or telephone with web browsing properties, the input device may be used in the manner of a stylus or a mouse to select from displayed buttons or menus. Therefore, the input device may be used to activate the browser of the host computer and to select options for retrieving a file, such as the previously described document, even one stored remotely. Using the input device, the user may select downloading of the file containing the information needed by the user. Next, the user may enter annotations to the downloaded file or files via the input device. Those edits may be transmitted to the remote location from which the file was downloaded, where the input device is equipped to perform communications with remote computing devices. Alternatively, the edits may be used to edit the file stored within the input device and/or a host computing device, assuming the input device is in communication with the host computing device.

In another embodiment, the file displayed on the monitor of a host computing device may be a spreadsheet, generated using spreadsheet software such as EXCEL™ from Microsoft® Corporation of Redmond, Wash. The location codes can be used to associate locations with given cells within the spreadsheet. The user may enter a numerical entry in the cell displayed on the screen. At that time, the input device captures images associated with the location of the input device and transmits that information to the host computing device. The processing software located in the host computing device, for example, and working in combination with the spreadsheet software, determines the identity of the cell selected for entry based on the detected location codes, and modifies the spreadsheet document contents accordingly.

The input device may also be used to recall images or other prestored information associated with particular gestures or combination of gestures. For example, the input device may be used to draw a symbol which the processing algorithms device is programmed to recognize. The maze pattern may be used to accurately detect movement of the input device over the pattern so that a particular symbol associated with such movement may be detected. For example, the user may control the input device to draw a symbol on the paper previously identified by the user to be associated with the company logo. The maze pattern may identify a combination of movements corresponding to the letter "M" followed immediately by the letter "S" as an instruction to designate entry of a logo of the Microsoft® Corporation. As a result, such prestored information, may be entered within a document by entry of a sequence of previously inputs.

The input device may also be used as a passive input device. In that mode, the input device may be used in combination with a computing device that senses movement of the input device using resistive sensing, for example. When used in combination with a device that includes a sensor board for detecting movement of an input device, such as a Tablet PC™ or personal data assistant, the input device may function in the manner of a stylus. Using the input device, electronic ink or other image data may be generated with the input device is positioned in very close proximity to the screen. Control functions may be entered in a similar manner. Additionally, the image displayed on the monitor of the particular computing device may also include data corresponding to a code that represents the relative position of that portion of the document. The location information extracted from the object using the camera may then be used to track movement of the input device, as a substitute to, or in combination with, movement detected using sensors of the computing device.

For example, a user may wish to create or modify an image on a portable computing device which already includes the ability to detect positioning of an input device, such as the Tablet PC™ or personal data assistant. The input device may function solely as a passive input device, such that information representing movement of the input device is generated by the computing device. The sensors of the computing device, however, may not have the ability to detected movement of the pen at a range required by the user in a given situation. For example, accurate detection of user inputs may be hindered when the user is traveling in an unstable vehicle. As the user edits a file by moving the input device over the surface of the display of the computing device, the input device may be jostled and displaced a significant distance from the sensor board. Image data captured by the input device may be used to detect movement of the input device within a plane horizontal to the surface of the computing device, even though the signals generated by the sensors of the computing device have become less accurate. Even if the sensors of the computer device are no longer capable of detecting movement of the input device, the image sensor may produce sufficient information to maintain an accurate representation of the movement of the input device to reflect the intended inputs of the user. Thus, even when used in combination with a computing device including the capability of sensing movement of the input device, the input device may function as a passive input device or as an active input device.

The input device may also be used in association with any paper, writing surface or other substrate, to record information corresponding to the handwriting of a user. Again, armed with only the input device and a writing surface, the input device may be used to draft a letter to a client. In this case, gesturing is detected on the basis of passive coding, wherein movements of the input devices are detected using other than codes embedded within and/or printed on the image of a surface of the substrate. For example, the user may draft the letter on a plain sheet of paper. As the user writes with the input device, the image sensor captures images of the paper. Objects within the images may be identified and their movement within the series of captured images are indicative of movement. Sensed objects may include artifacts or other objects on the surface of the paper, which may correspond to a watermark or other defect of the paper. Alternatively, the paper may include ruled lines which may also be used to calculate movement of the pen over the surface. Even in the absence of paper, relative movement of the input device may be determined. The input device could be moved over the surface of a desk, the grain of the wood providing the objects necessary for detecting relative movement of the input device. In a manner similar to that previously described, a user can draft a letter on paper, or any surface over which movement can be detected optically. The movements of the input device may be stored in memory and/or converted into information representing those gestures.

In yet another embodiment, the portable device may be used as a substitute for a portable computing device. For example, having just crafted a solution to the circuit failures associated with her company's pacemaker, but with no laptop or other computing device available, an engineer may turn to her input device as a suitable replacement for recording her thoughts as she travels by train to meet the rest of the design team. Making the most of the time available (and with the ink cartridge removed or the cap in place), on the back of the chair in front of her, the user composes a sketch representing a modification to the suspect electrical circuit in question. She activates the input device; sets it in a mode conducive to generating a sketch (which may, for example, include deactivation of conversions), and begin sketching a simplified design representing a solution to the problem. The input device may then store the file representing the handwritten strokes. Switching out of a sketch mode, notations and references may be jotted down next to relevant portions of the sketch, and those entries incorporated within the image file. For example, the user may switch to a notation mode, in which gestures corresponding to letters are recognized. Thus, she may incorporate a description of her proposed solution along with the sketch. Rather than wait until reaching the medical research center, the operator may choose to transmit the schematic to the rest of the design team for full consideration prior to the scheduled meeting. Such transmission may be achieved any number of ways, including uploading the revised document from the input device to a portable wireless device such as a cellular telephone. The information may then be used to generate an image file such as a VISIO™ document.

Once transmitted to the remaining members of the team, the previously described file corresponding to a sketch of a schematic may be displayed on the monitor of a team member's host computing device. For example, the image and accompanying text may be presented on the display of a desktop computer. By placing the input device in proximity to the image of the file displayed on the monitor, additional annotations may be added to those displayed. In that case, movement of the input device may be detected by measuring the relative movement of objects within images captured by the optical sensor of the input device. Signals generated by the input device may be processed by software stored within the input device, or transmitted to the host computing device for processing. Processing of the detected movement may generate electronic ink, text, or other data representing the notations entered via the input device.

The input device may be used in conjunction with a computing device having sensors for detecting movement of the input device, even in the absence of location codes. For example, the input device may be used as a source for generating handwritten notes on a personal data assistant or other computing device designed for use with a stylus. Therefore, while running errands a user may be reminded of and wish to add an item to an existing "to do list." The user retrieves the list stored in a host computing device, such as a personal data assistant. Positioning the tip of the input device over the display of the personal data assistant, the user is able to traverse through menus and make selections to retrieve the desired list. Presented with this list, the user may input checks on the screen of the host device in empty boxes located next to descriptions of tasks already completed. The input device captures images of the screen including data corresponding to the box and transmits that data to the host computing device. Using a processing algorithm for analyzing image data, the host computing device then detects the shape of the box as an object for which an entry may be made. To successfully enter check marks, the image data may be processed to detect movement of the pen over and within the area of the box, the gestures forming the recognized shape of a "check." The host device then modifies the file associated with the list to include a representation of a check within the box. Positioning the input device over the space following the last item in the list, the user enters text describing an additional item. The sensors of the host device detect movement of the input device and generate data representing those inputs. The inputs are converted into text and displayed to the user, along with an empty box.

Similarly, a user of Microsoft® Reader, for example, such as a student reading an assigned novel, may wish to jot down notes next to the relevant text. The image displayed on the monitor of the portable host device is annotated using the input device. For example, the user positions the input device over the monitor of the host computer, a Tablet PC™ for example, and enters handwritten notes next to the relevant text. The gestures are detected by the sensors of the host device and stored as electronic data which is converted into image data and displayed on the screen. The notes may remain in handwritten form or may be converted into alphanumeric characters. The notes may not be seen without actuation of additional functions, such as activating viewing of appended comments or positioning the input device over highlighting or some other indication that annotations are present. The notes may then be stored in a separate file, or stored with a copy of the electronic version of the novel stored within the host computer.

In yet another embodiment, information from additional sensors forming part of the input device may be used to supplement or completely replace other forms of movement detection. Such additional sensors may detect linear acceleration of the input device, angular acceleration, velocity, rotation, depressive force, tilt, changes in electromagnetic fields or any sensed indication of movement or positioning of the input device. Such information may aid in an effort to produce more accurate movement detection. Alternatively, the additional sensors may provide the only information available at a given time. For example, the input device may be used in conjunction with a generally uniform surface, such as blank paper. In such cases, the image captured by the optical sensor may provide insufficient information to consistently and accurately detect movement of the input device. If optical motion detection becomes more difficult, such as if objects for tracking movement of the input device become more difficult to detect, in accordance with one embodiment for optically detecting movement, additional information from the additional sensors may be used to provide more refined motion detection. Specifically, the algorithm or algorithms used to determine position and/or movement may incorporate calculations to factor in the additional information and to thereby supplement movement and/or location detection if the optical motion detection.

If optical detection fails to provide useful results, then the additional sensors may provide the only information with which to detect movement. For example, if the user attempts to sketch out a drawing on the uniform white counter of a laminated countertop, the optical sensing system may provide a sufficient data representative of movement. In that case, the additional sensors may provide sufficient information to generate an acceptably accurate representation of input information.

For example, if the input device moves a sufficient distance from the surface being scanned, the optical sensor unit may not capture an accurate representation of the image provided. In that case, additional information from the additional sensors may be used to compliment data obtained by the image of the object over which the input device is moved. Thus, even if the input device moves an inch or greater from the display over which it is being moved (the "z-axis), sensors within the input device may provide an indication of movement of the pen within the plane of the display, i.e., in the horizontal and vertical directions.

For example, an input device used in conjunction with a laptop computer is positioned on the tray table in front of the user. An image of a document, with a maze pattern incorporated into the background, is displayed on the screen of the laptop. Annotations entered by the user are shown in solid blue ink. The seat belt sign comes on as the airplane experiences turbulence. As the user reaches over the keyboard of the laptop computer and adds another word to the annotation, his hand quickly drifts away from the surface of the screen. Although the image sensor may not accurately detect the lines forming the maze pattern displayed, movement in the x and y axis is measured by the additional sensors incorporated within the input device.

Figure 8:
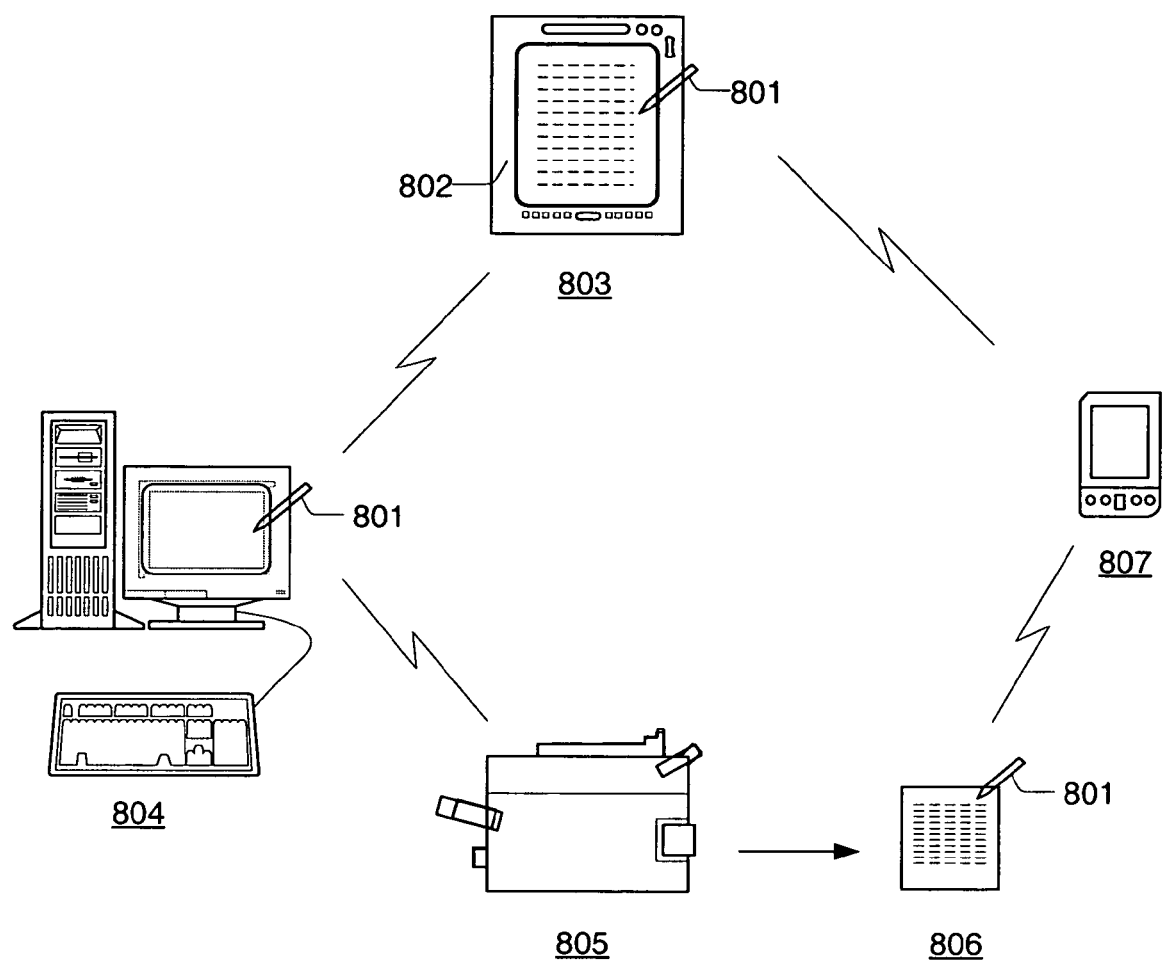
FIG. 8 illustrates uses of an input device in accordance with several illustrative embodiments of the present invention.

FIG. 8 illustrates uses of an input device in accordance with several illustrative embodiments of the present invention, as a document is created, transmitted and edited using an input device in various environments. The following description is merely an illustration of uses of the input device and is not intended to limit the structure or functionality of the present invention.

The input device 801 may be used to extend the life of a document by allowing the creation and/or editing of documents in a wide range of environments and for use in association with numerous devices. Using the input device 801, a document 802 may be electronically created on the screen of one computing device, such as Tablet PC 803 illustrated. For example, the input device 801 may be used to generate a handwritten draft of a document. Electronic ink corresponding to the information entered on the screen of the Tablet PC 803 is generated as the input device 801 functions as a stylus for the Tablet PC 803. The electronic ink may be converted into text form and stored in the Tablet PC 803.

The electronic file representing the document may be transmitted to a second computing device, such as desktop PC 804. In that environment, the document may be edited on the screen of the desktop device using the input device 801 operating as an independent input unit. Because the input device 801 senses relative location of the input device 801 within the displayed image of the document, edits entered on the screen of the desktop device may be reflected in the electronic document, even if the display does not include elements for sensing positioning of the input device 801. The edits generated using the input device 801 may be transmitted to the desktop PC 804 as they are generated or may stored within the input device 801 for transmission to any PC at a later time. The edits may be entered into the version of the document stored in the desktop PC 804.

The created document may also be output in hard-copy form by a printer, such as printer 805 linked to the desktop PC 804. The hard-copy 806 version of the document may include information or codes designating the relative location of the input device 801 at any location in the document, using a maze-pattern, for example. The hard-copy may be marked-up by one or more users each having an input device 801, and the edits of each user generated by the separate input device 801. Along with information representing edits, information identifying the pen used to generate those edits may be provided as well. For example, the inputs may be reflected using underlined colored text such as that found in applications for tracking changes made to documents. The edits/inputs may be forwarded from the desktop PC 804 to the Tablet PC 803, for incorporation into that document. Alternatively, the edits may be stored within the input device 801 and uploaded at a later time.

The document may also be output on plain paper, or on any substrate not including indications of relative positioning of the input device 801. Again, the hard-copy 806 may be marked-up by one or more users having an input device 801, and the edits of each user generated by the input device 801. In this example, position or movement of the pen 801 may be determined using coding techniques for optically sensing movement of the input device 801 over the paper. As noted, location/movement may be determined using a comparison algorithm in which the relative position of objects within each frame of image data are detected and used to determine movement of the input device 801. The resulting edits may be transmitted to the computing device in which the document originated, for example, for updating of the original data file. The edits may be transmitted through a computing device, such as the Pocket PC 807 for transmission to the destination device either through a wireless or wired communication or upon docking the device containing edits in the computing device.

The electronic document may also be transmitted to a second computing device, such as the Tablet PC 803 illustrated. In that environment, the document may be edited on the screen of the tablet device 803 using the input device 801 as a simple stylus. Those inputs may be forwarded from the Tablet PC 803 to the computing device storing the original copy of the document as annotations to the document or as edits for incorporation into that document, for example.

While the description above and accompanying figures depict embodiments utilizing specific components, the addition of components and/or removal of any component depicted is within the scope of the present invention. Similarly, the relocation of various components within the input device structure may be implemented without greatly impacting the accuracy with which the camera or the inertial sensors detect movement of the pen and produce electronic ink. For example, the image sensor may be replaced by or supplemented with a sensing device for detecting properties of the surface or object over which the input device may be moved. Thus, if the maze pattern was formed on the surface of an object such that the pattern could be detected based on the radiation of energy outside the visible light spectrum, reflectance of such energy transmitted to the object, or other such sensing techniques. Sensing of any property of the surface may be detected and used to determine position and/or movement of the input device over the surface of an object. As a further example, a microphone sensing system may be employed such that the microphone detects acoustic reflections or emissions from the object over which the input device is positioned.

The illustrative embodiments described and illustrated above have described an input device implemented in the shape of a pen. Aspects of the present invention are applicable, however, to input devices of any number of shapes and sizes.

Use of such an input device should enable personal computing in any location. Thus, users equipped with the described input device may generate or edit data files regardless of where they may be. Documents and other information may be generated, edited or recorded in an office setting, in a classroom, in a hotel, while in transit, or even on the beach.

As noted, the input device may include a suitable display. Alternative, the display of a host computing device may be used to review documents and images created. The user may select formatting of the document before or after the information, such as text, is input, or may review the document and make changes to the format of the document. Viewing the document created on such a display, in the context of the above example, the user may insert a header including his or her address in the appropriate location.

An input device equipped with a camera and linked to a host PC in order to read positionally encoded medium, such as paper or transparent film, provides for electronic annotation of documents. The present invention provides for a method of using the input device in conjunction with a whiteboard or other writing surface as the encoded medium. The input device may attach to a conventional whiteboard marker. A whiteboard may be encoded directly with the position information on its surface or via active light emitting diodes that trace out the encoded pattern on the whiteboard. Embedding an embedded interaction coding (EIC) pattern into printed documents or into a surface of a specific platform provides a new interaction mode for computing, which can keep a user's experience consistent.

Figure 9A:
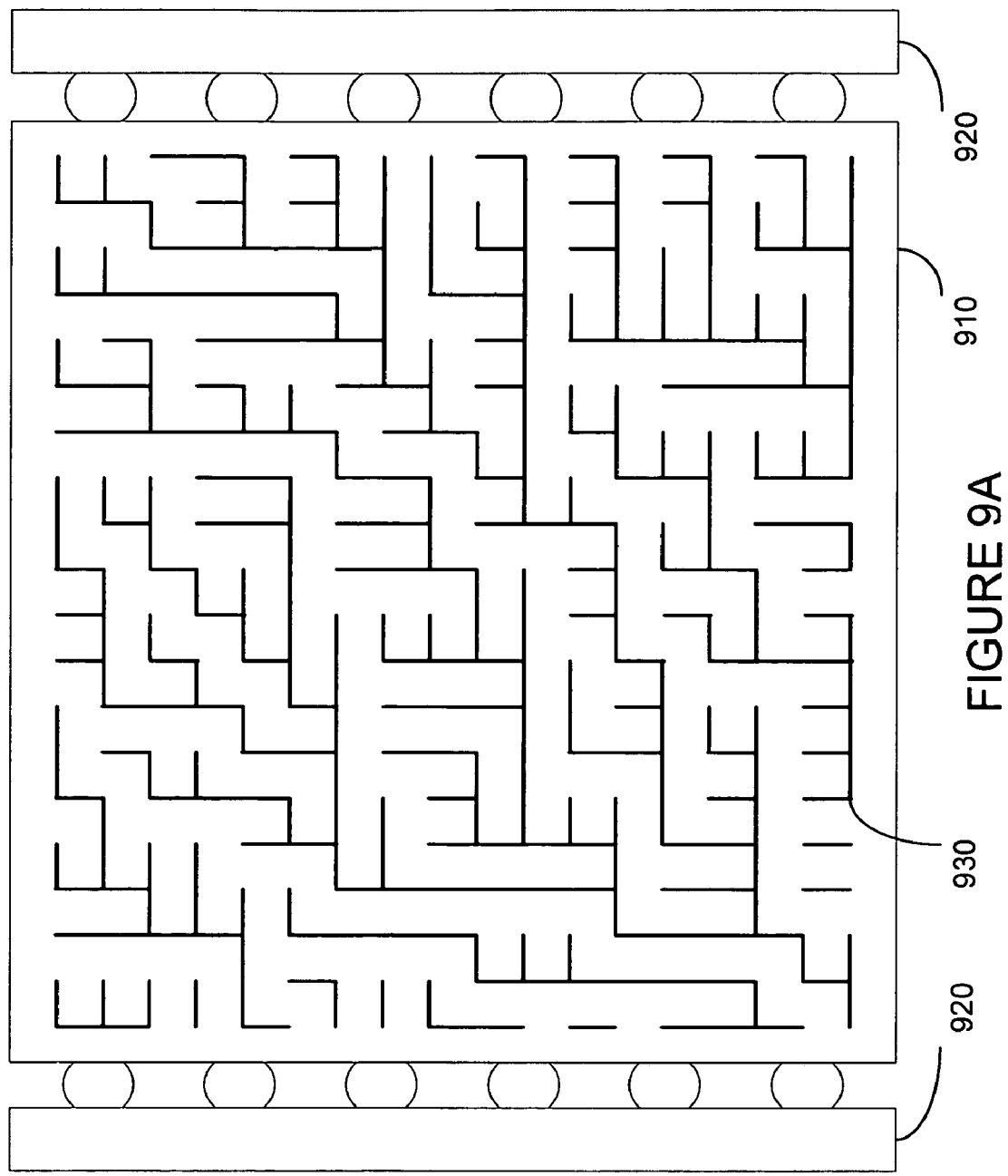
FIG. 9A illustrates a light guide plate in accordance with at least one aspect of the present invention.

FIG. 9A illustrates a light guide plate in accordance with at least one aspect of the present invention. An EIC pattern can be embedded into a light guide plate 910, beside which two infrared light emitting diode (IR-LED) arrays 920 are coupled. Each bar of the embedded maze pattern 930 will emit IR light based on light guide technology. An opening in the pattern allows for the infrared light to pass through. The light guide plate can be coupled to the surface of a whiteboard. The input device can capture a portion of the EIC pattern 930 illuminated by the light guide plate 910. As such, a user can draw and/or write on the whiteboard and the input device can track the movement of the input device over the whiteboard surface to capture image data representative of the ink pattern created by the user on the surface of the whiteboard. The light guide plate 910 and arrays 920 can be a separate surface on which a user can draw and/or write. Alternatively, the light guide plate 910 and array 920 can be built into a whiteboard.

Figure 9B:
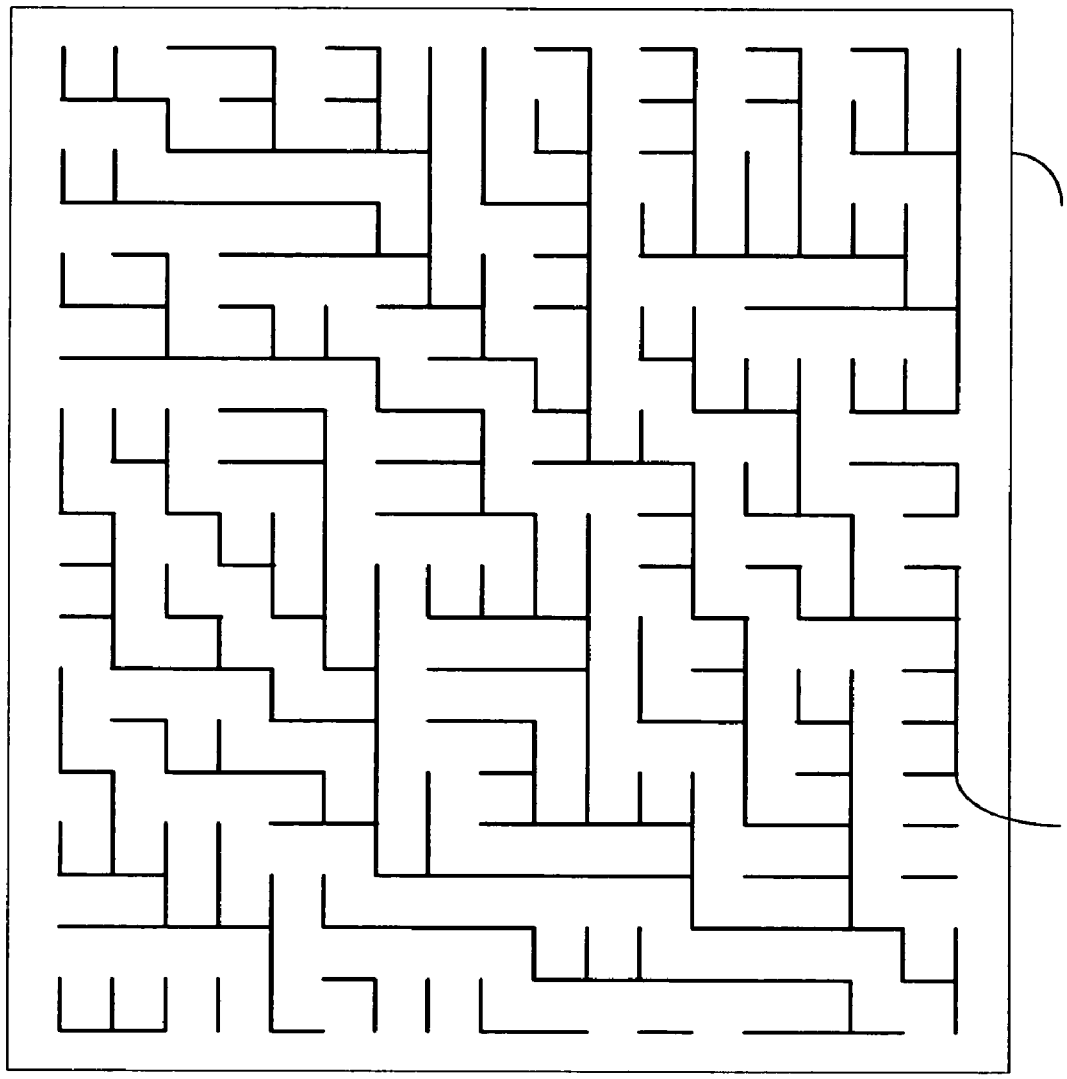
FIG. 9B illustrates a medium including an embedded interaction coding pattern in accordance with at least one aspect of the present invention.

FIG. 9B illustrates a medium 940 including an embedded interaction coding (EIC) pattern 930 in accordance with at least one aspect of the present invention. The medium 940 including the EIC pattern 930 can be coupled to the surface of a conventional whiteboard by, for example, taping a medium 940 printed with the EIC pattern 930. It will be appreciated that the medium 940 can be attached to a whiteboard in a number of ways including any way in which the medium may be coupled to a surface having the characteristics of the whiteboard. The EIC pattern may be slightly visible. The EIC pattern 930 is configured to not interfere with writing, drawing, and/or reading. Medium 940 allows a user to operate the input device on a number of different surfaces. For example, a user can place the EIC pattern 930 on a piece of white printer paper as the medium 940. The user can connect the paper to a surface, such as a wall in an office and/or conference room, and make annotations on the paper medium 940, allowing the input device to track its movement over the paper medium 940. In the case where the medium 940 is a transparent film, the film can be printed with a standard 600 DPI laser printer. Alternatively, the EIC pattern 930 can be printed on a paper medium 940. It should be understood by one skilled in the art that the medium 940 is not limited to the examples of a transparent film and/or paper as described above and that any type of medium for writing and/or drawing may be included, such as, but not limited to construction paper, a wall, a wooden surface, a blackboard surface, and a floor.

Figure 10:
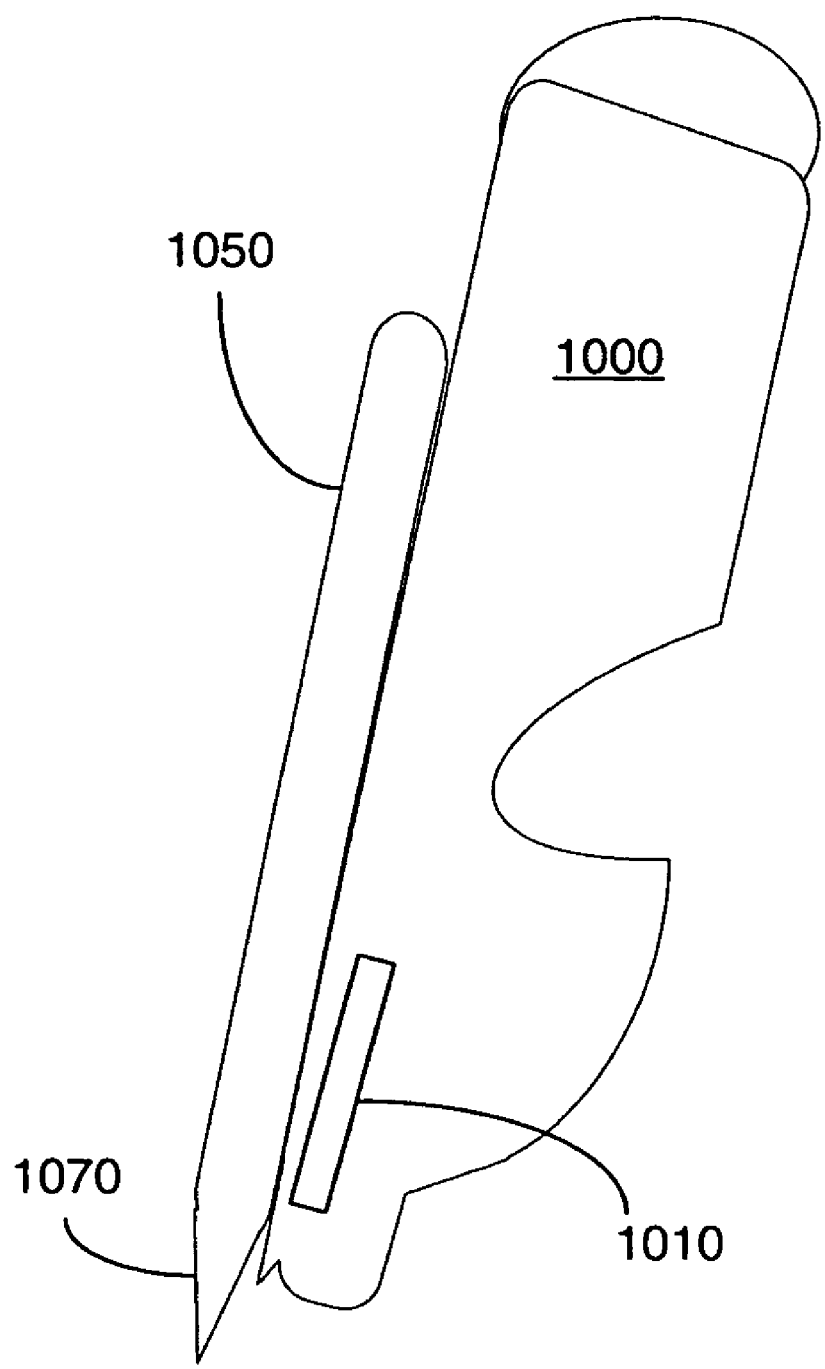
FIG. 10 illustrates an input device coupled to a whiteboard marker in accordance with at least one aspect of the present invention.
Figure 11:
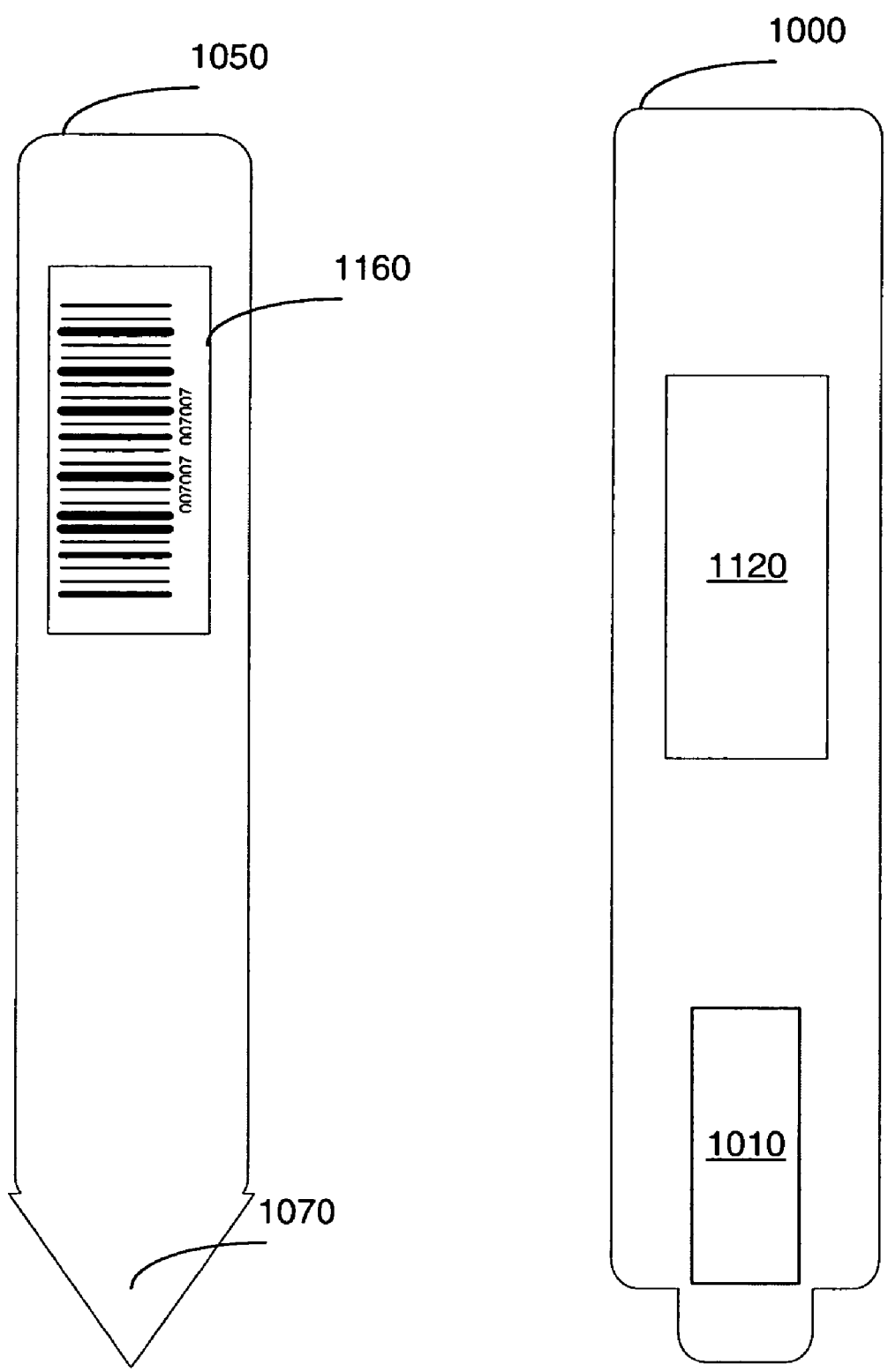
FIG. 11 illustrates an input device and a whiteboard marker in accordance with at least one aspect of the present invention.

FIG. 10 illustrates an input device 1000 coupled to a whiteboard marker 1050 in accordance with at least one aspect of the present invention. FIG. 11 illustrates the input device 1000 and the whiteboard marker 1050 in accordance with at least one aspect of the present invention. In FIG. 10, an input device 1000 is shown coupled to a conventional whiteboard marker 1050. The input device 1000 may be configured to attach to the conventional whiteboard marker 1050 in a number of different manners. For example, input device 1000 may include a sleeve into which the conventional whiteboard marker 1050 may rest. Alternatively, the input device 1000 may include a strap that wraps around the conventional whiteboard marker 1050. It should be understood by one skilled in the art that a number of different methods for connecting the input device 1000 and the conventional whiteboard maker 1050 may be employed and that the present invention is not so limited to those described above.

In FIG. 1, the color and width of tip 1070 of the conventional whiteboard marker 1050 may be identified by the input device 1000. Input device 1000 may include two cameras, where one camera 1010 may used to capture EIC image data to decode absolute position in an EIC pattern embedded surface, and the second camera 1120 may be used to capture an identification 1160, such as a bar code, on the conventional whiteboard marker 1050. The bar code 1160 can be used as marker ID information to distinguish a different marker 1050 with a tip 1070 having a different color or thickness. When a whiteboard board marker 1050 is coupled to the input device 1000, the input device 1000 can capture the marker ID information 1160. Hence, the digital ink can be recovered by camera 1010 and rendered in the color and width of the conventional whiteboard marker 1050 that is used. It should be understood by those skilled in the art that other forms of identification may be used and that the description of a bar code on the conventional whiteboard marker is but one example.

Figure 12:
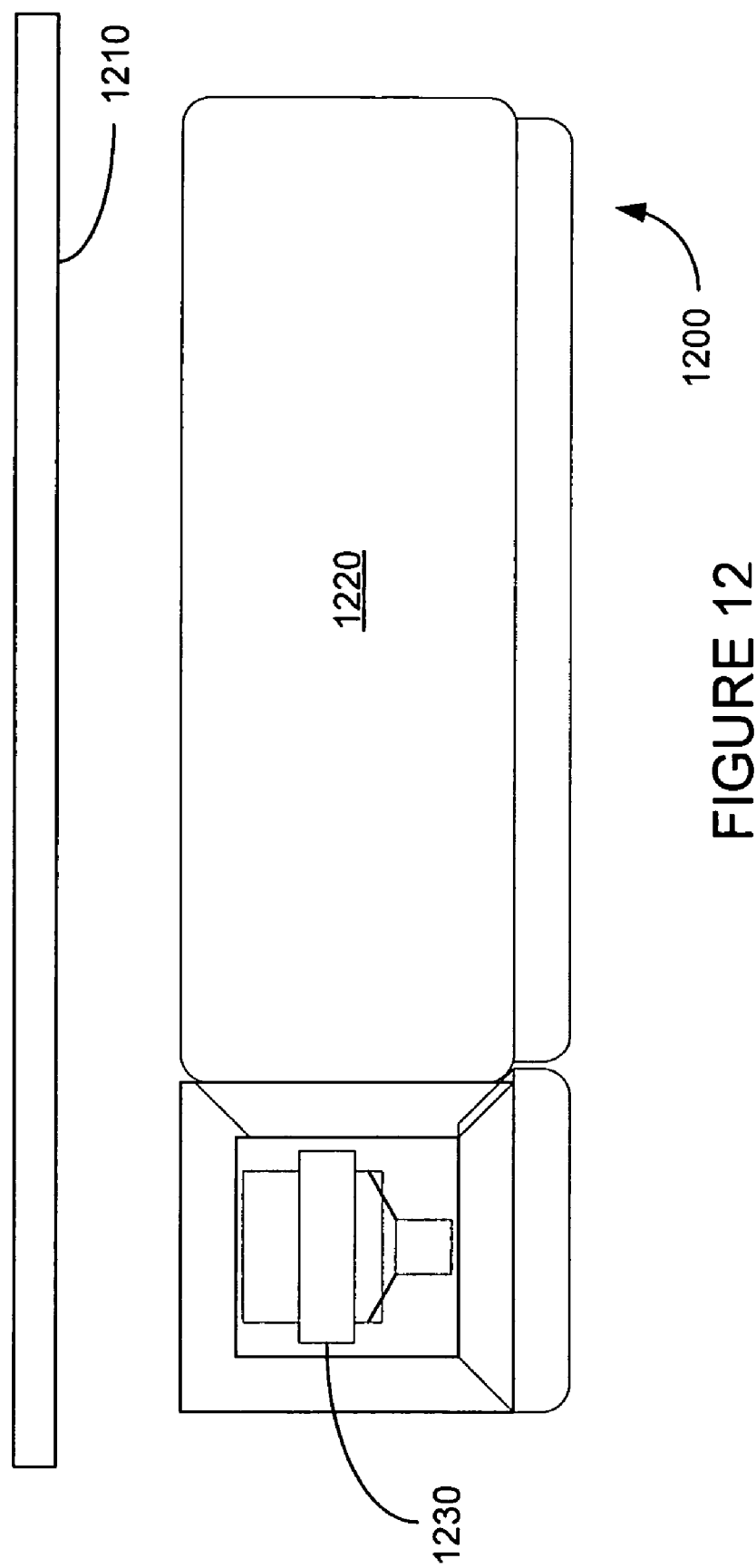
FIG. 12 illustrates a digital eraser in accordance with at least one aspect of the present invention.

FIG. 12 illustrates a digital eraser 1200 in accordance with at least one aspect of the present invention. The digital eraser 1200 can be used to modify what a user is writing and/or drawing on a writing surface 1210. The modifications can be transmitted to the host PC via the communication unit, such as the Bluetooth® component. A voice capture device can be built into the digital eraser 1200 to capture audio that a speaker may want to associate with the modification. It is natural to use an eraser to modify what is written on or clear a specific area of a writing surface 1210. Input device 1000 can track all ink content applied to the writing surface 1210. The tracked ink content is transmitted to a host PC for processing. Similarly, modifications need to be tracked and transmitted to an ink-processing system. Digital eraser 1200 is configured to track modifications.

As shown in FIG. 12, a conventional whiteboard eraser 1220 may be coupled to the digital eraser 1200. There are a number of different methods in which the conventional whiteboard eraser 1220 may be coupled to the digital eraser 1200. For example, digital eraser 1200 may include a sleeve for sliding the conventional whiteboard marker 1220 into the digital eraser 1200. Alternatively, digital eraser may include a clamping system that clamps one side of the conventional whiteboard marker 1220 to the digital eraser 1200.

As shown, a camera 1230 on the digital eraser 1200 enables the device 1200 to capture the EIC pattern of the surface 1210 that the digital eraser 1200 is moving on. Moreover, force sensors (not shown) may be used to detect pressure against the surface 1210 to thereby initiate operation of the camera 1230. A processor chip in the digital eraser 1230 can include the same functions, such as vision processing and decoding, as in the input device 1000 and illustrated in FIGS. 6A and 6B. Similarly to input device 1000, the results of absolute location and orientation can be transmitted to a PC computer through a communication unit, such as the Bluetooth® component 681. The location and orientation information as well as other data can be transmitted to a host PC in real time. Further still, an electronic representation of the images captured from the whiteboard can be transmitted to a remote PC as well. The erasing area can be calculated through the absolute position of the center of the captured image and its orientation to the conventional whiteboard eraser 1220, since the relationship of the camera 1230 and the conventional whiteboard eraser 1220 is fixed.

In a collaborative environment such as a meeting and/or presentation, a whiteboard can help users capture ideas quickly with the use of a whiteboard marker. At the time that a user writes and/or draws content onto the whiteboard, the user often speaks to express the ideas in more detail or for a particular point and/or caveat. In such a case, both the ink content and speech content contain information that may be needed in future use of the information presented. As such, input device 1000, digital eraser 1200, and/or a whiteboard can be configured to record audio and wirelessly transmit the audio data to an external host PC. Speech recognition technology can be used to segment and recognize keywords in the speech for editing and manipulation. The speech recognition technology can be utilized within and/or external to the input device 1000, digital eraser 1200, and/or whiteboard. The audio data can be associated with a particular input device 1000 and/or user. Similarly, the audio data can be associated with a particular entry of new content on the whiteboard via the input device 1000 and/or modification, e.g., erasing, of content on the whiteboard via the digital eraser 1200. In addition, the recorded audio can be associated with the entry of new content and/or modification of content. The audio recording and/or information pertaining to the audio recording can be directly included in an electronic representation of the whiteboard. When a user edits, e.g., erases, content on the whiteboard, any audio data that is recorded at the same time can be associated with that particular modification of content and/or that particular user.

Although the invention has been defined using the appended claims, these claims are illustrative in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

For instance, in various embodiments, a certain order to the data has been shown. However, any reordering of the data is encompassed by the present invention. Also, where certain units of properties such as size (e.g., in bytes or bits) are used, any other units are also envisioned.

We claim:

1. An input device for generating data representative of handwritten strokes, the input device comprising:
   an image capturing unit for capturing an image of an area of an object over which the input device is positioned and generating captured image data;
   a processor for processing the captured image data to generate data representative of a location of a writing implement;
   an indicia capturing device for capturing indicia information of the writing implement;
   an audio recorder to capture audio data;
   a force sensor for detecting application of a force against the input device, wherein the processor is configured to activate the audio recorder to record audio data in response to the detected application of force; and
   a memory for storing data representative of handwritten strokes based on the data representative of the location of the writing implement;
   wherein the object includes an encoded medium for connection to a surface.

2. The input device of claim 1, wherein the writing implement is coupled to the input device.

3. The input device of claim 2, wherein the writing implement is coupled to the input device by a sleeve.

4. The input device of claim 1, wherein the input device includes the writing implement.

5. The input device of claim 1, wherein the indicia capturing device corresponds to a second image capturing device.

6. The input device of claim 5, wherein the indicia information corresponds to a bar code of the writing implement.

7. The input device of claim 1, wherein the processor is configured to process the indicia information to generate data representative of a width of the writing implement.

8. The input device of claim 1, wherein the processor is configured to process the indicia information to generate data representative of a color of the writing implement.

9. The input device of claim 8, wherein the processor is configured to process the indicia information to generate data representative of a width of the writing implement.

10. An apparatus for generating data representative of erasing stroke, the apparatus comprising:
    an image capturing unit for capturing an image of an area of an object over which the image capturing unit is positioned and generating captured image data, the object being external from the apparatus;
    a processor for processing the captured image data to generate data representative of a location of a portion of an eraser; and
    an audio recorder to capture audio data;
    a force sensor for detecting application of a force against the apparatus, wherein the processor is configured to activate the audio recorder to record audio data in response to the detected application of force; and
    a memory for storing data representative of erasing strokes based on the data representative of the location of the portion of the eraser,
    wherein the object includes an encoded medium for connection to a surface.

11. The apparatus of claim 10, wherein the eraser is coupled to the apparatus.

12. The apparatus of claim 11, wherein the eraser is coupled to the apparatus by a holding means.

13. The apparatus of claim 10, wherein the apparatus includes the eraser.

14. The apparatus of claim 10, wherein the processor is configured to activate the image capturing unit in response to the detected application of force.

15. A method for creating image information representing user inputs comprising steps of:
- positioning an image sensor, coupled to an eraser, over an area of an object, the object being external from the image sensor;
- capturing an image of the area of the object over which the image sensor is positioned;
- generating data representing a location of the eraser based on the captured image;
- detecting application of a force against the eraser;
- capturing audio data in response to the detected application of force; and
- creating an image file representative of erasing strokes based on the generated data representing the location of the eraser,
- wherein the object includes an encoded medium for connection to a surface.

16. The method of claim 15, further comprising a step of transmitting the image file to an external computer.

17. A method for creating image information representing user inputs comprising steps of:
- positioning an input device, coupled to a writing implement, over an area of an object;
- capturing data representative of an indicia of the writing implement;
- capturing an image of the area of the object over which the input device is positioned;
- generating data representing a location of the writing implement based on the captured image;
- detecting application of a force against the eraser; capturing audio data in response to the detected application of force; and
- creating an image file based on the generated data representing the location of the writing instrument,
- wherein the object includes an encoded medium for connection to a surface.

18. The method of claim 17, wherein the indicia corresponds to a bar code.

19. The method of claim 17, wherein the indicia corresponds to a color of the writing implement.

20. The method of claim 17, wherein the indicia corresponds to a width of a tip of the writing implement.

21. The method of claim 17, further comprising a step of transmitting the image file to an external computer.

* * * * *